(12) United States Patent
Stone et al.

(10) Patent No.: US 10,292,366 B2
(45) Date of Patent: May 21, 2019

(54) PET TOY WITH MULTI-FUNCTION MODULES

(71) Applicant: The KONG Company, LLC, Golden, CO (US)

(72) Inventors: John James Stone, Golden, CO (US); Amy Brickle, Golden, CO (US)

(73) Assignee: THE KONG COMPANY, LLC., Golden, CO (US)

( * ) Notice: Subject to any disclaimer, the term of this patent is extended or adjusted under 35 U.S.C. 154(b) by 0 days.

(21) Appl. No.: 15/703,795

(22) Filed: Sep. 13, 2017

(65) Prior Publication Data
US 2018/0000048 A1    Jan. 4, 2018

Related U.S. Application Data

(63) Continuation-in-part of application No. 15/211,973, filed on Jul. 15, 2016, and a continuation-in-part of application No. 14/927,874, filed on Oct. 30, 2015.

(60) Provisional application No. 62/293,375, filed on Feb. 10, 2016, provisional application No. 62/119,348, filed on Feb. 23, 2015.

(51) Int. Cl.
*A01K 15/02* (2006.01)

(52) U.S. Cl.
CPC .................................. *A01K 15/025* (2013.01)

(58) Field of Classification Search
USPC ......... 119/702, 707–711; D30/160; 446/184, 446/188, 404, 415, 418, 207, 209, 213, 446/216; 473/571, 594
See application file for complete search history.

(56) References Cited

U.S. PATENT DOCUMENTS

| | | | | |
|---|---|---|---|---|
| D133,869 S | * | 9/1942 | Donahue | D21/406 |
| 3,943,643 A | | 3/1976 | Fisher et al. | |
| 4,223,636 A | | 9/1980 | Dishong | |
| 4,399,632 A | | 8/1983 | Iseki | |
| 4,534,316 A | | 8/1985 | Bowlsby | |
| 4,571,208 A | | 2/1986 | Saigo et al. | |
| 4,973,286 A | | 11/1990 | Davison | |
| 5,078,637 A | | 1/1992 | McFarland | |
| 5,758,604 A | | 6/1998 | Jorgensen | |
| 6,014,950 A | | 1/2000 | Rogers | |
| D427,391 S | * | 6/2000 | Gill | D30/160 |
| 6,110,001 A | | 8/2000 | Chae | |
| 6,112,703 A | | 9/2000 | Handelsman | |
| 6,123,599 A | | 9/2000 | Chiang | |
| 6,216,640 B1 | | 4/2001 | Zelinger | |
| D451,651 S | * | 12/2001 | Kaplan | D24/211 |
| 6,360,693 B1 | | 3/2002 | Long, III | |
| 6,439,950 B1 | | 8/2002 | Goldman et al. | |
| 6,470,830 B2 | | 10/2002 | Mann | |

(Continued)

*Primary Examiner* — Andrea M Valenti
(74) *Attorney, Agent, or Firm* — Berg Hill Greenleaf Ruscitti, LLP.

(57) ABSTRACT

A pet toy includes an anchor member and at least one ring member connected thereto. The ring member has a noise making device. In one embodiment, the noise producing feature includes a squeaker protected within a housing disposed within the interior of the toy. In another embodiment, the noise producing feature includes multiple layers of material with one of the layers producing sound. When an outer shell of the ring member is deflected or compressed by contact, noise is produced by the noise making device.

11 Claims, 18 Drawing Sheets

(56) References Cited

U.S. PATENT DOCUMENTS

| | | |
|---|---|---|
| 6,557,494 B2 | 5/2003 | Pontes |
| 6,609,944 B1 | 8/2003 | Viola |
| 6,663,457 B2 | 12/2003 | Ritchey |
| 6,679,927 B2 | 1/2004 | Strongin |
| 6,786,792 B2 | 9/2004 | Ritchey |
| 6,892,674 B1 | 5/2005 | Dubinns et al. |
| 6,935,274 B1 | 8/2005 | Rothschild |
| 6,981,471 B1 | 1/2006 | Dubinns et al. |
| 7,063,044 B2 | 6/2006 | Handelsman et al. |
| 7,066,779 B2 | 6/2006 | Willinger |
| 7,100,539 B2 | 9/2006 | Levan |
| 7,144,293 B2 | 12/2006 | Mann et al. |
| 7,169,008 B2 | 1/2007 | Ritchey |
| 7,201,117 B2 | 4/2007 | Ritchey et al. |
| 7,207,294 B2 | 4/2007 | Stasio |
| 7,264,533 B2 | 9/2007 | Chan et al. |
| D552,307 S | 10/2007 | Renforth et al. |
| 7,343,878 B2 | 3/2008 | Ritchey et al. |
| 7,363,880 B2 | 4/2008 | Ritchey et al. |
| 7,455,033 B2 | 11/2008 | Curry |
| 7,513,220 B2 | 4/2009 | Ragonetti et al. |
| 7,574,977 B2 | 8/2009 | Ritchey |
| 7,587,993 B2 | 9/2009 | Jager |
| 7,597,065 B2 | 10/2009 | Jager |
| 7,600,488 B2 | 10/2009 | Mann |
| 7,644,684 B2 | 1/2010 | Ritchey |
| 7,665,423 B2 | 2/2010 | Ritchey et al. |
| 7,722,428 B2 | 5/2010 | Di Lullo |
| 7,736,212 B2 | 6/2010 | Willinger |
| 7,736,213 B2 | 6/2010 | Willinger et al. |
| 7,762,214 B2 | 7/2010 | Ritchey |
| 7,810,455 B2 | 10/2010 | Axelrod et al. |
| 7,833,079 B2 | 11/2010 | Willinger et al. |
| 7,950,353 B2 | 5/2011 | Axelrod et al. |
| D650,537 S * | 12/2011 | Oblack .................. D21/713 |
| 8,235,762 B2 | 8/2012 | Rutherford et al. |
| 8,573,159 B1 * | 11/2013 | Crotty .................. A01K 15/025 |
| | | 119/707 |
| D710,554 S * | 8/2014 | Byrne ..................... D1/199 |
| 8,978,590 B2 | 3/2015 | Nunn et al. |
| D780,384 S * | 2/2017 | Miksovsky .................. D30/160 |
| D781,525 S * | 3/2017 | Kreamer .................. D1/102 |
| 2005/0227572 A1 | 10/2005 | Ritchey |
| 2006/0060154 A1 * | 3/2006 | Wesely .................. A01K 15/026 |
| | | 119/709 |
| 2007/0245976 A1 * | 10/2007 | Ritchey .................. A01K 15/025 |
| | | 119/709 |
| 2007/0283900 A1 | 12/2007 | Jager |
| 2009/0038559 A1 | 2/2009 | Markham |
| 2009/0038560 A1 | 2/2009 | Markham |
| 2011/0017148 A1 * | 1/2011 | Tsengas .................. A01K 15/025 |
| | | 119/707 |
| 2011/0277696 A1 * | 11/2011 | Rutherford .......... A01K 15/026 |
| | | 119/707 |
| 2014/0130750 A1 * | 5/2014 | Valle .................. A01K 15/025 |
| | | 119/708 |
| 2015/0128876 A1 * | 5/2015 | Axelrod ............... A01K 15/026 |
| | | 119/709 |
| 2015/0230429 A1 | 8/2015 | Mak |
| 2016/0113243 A1 * | 4/2016 | Mullin ................. A01K 15/026 |
| | | 119/709 |
| 2016/0242391 A1 | 8/2016 | Stone et al. |

\* cited by examiner

PET TOY WITH MULTI-FUNCTION MODULES

CROSS-REFERENCE TO RELATED APPLICATIONS

This application is a continuation in part of U.S. application Ser. No. 15/211,973, filed on Jul. 15, 2016,which claims the benefit of priority of U.S. Provisional Application No. 62/119,348, filed Feb. 23, 2015, U.S. application Ser. No. 15/211,973 is a continuation-in-part of U.S. application Ser. No. 14/927,874, filed Oct. 30, 2015, which claims the benefit of priority of U.S. Provisional Application Nos. 62/150,906, filed Apr. 22, 2015, and 62/119,348, filed Feb. 23, 2015. Each application is incorporated herein in their entirety by reference.

FIELD OF THE INVENTION

The invention relates to pet toys, and more particularly, to a pet toy having two primary components; a first component with a noise producing element disposed therein and a second component attached to the first component.

BACKGROUND OF THE INVENTION

Due to the increased commercialization of pet products and particularly pet toys, there are now a wide range of commercially available pet toys with distinct functions. Pet toys can be made from many different types of materials along with a nearly limitless number of shapes and colors.

One general category of pet toys is those made of a flexible or elastomeric material, such as rubber. These toys, if made from quality materials, can withstand the biting action of an animal, and can keep an animal occupied for extended periods of time. It is known to place treats in these types of toys to increase the interaction of the animal with the toy. A sound emitting device, often referred to as a "squeaker", is also known to be placed inside the toy to further stimulate the animal. Many rubber pet toys are made of a single layer of poor quality rubber material. An animal may therefore chew through and destroy the pet toy in a relatively short period of time.

Another general category of pet toys is those which may generally be referred to as "plush" toys. These types of toys are made from different types of cloth or fabric, and may also include material woven into strands, such as nylon rope. The plush toy is typically stuffed with a fibrous material, such as polyester stuffing, to provide the toy with an increased thickness or bulk that enables the animal to chew on the toy. Because the fibrous material is typically not strong enough to prevent the teeth of the animal from fully penetrating the outer cloth or fabric covering, plush toys are prone to being easily destroyed by the animal simply chewing through the outer covering. Plush toys may also include squeakers to further stimulate the animal.

Whether a pet toy is made from a flexible/elastomeric material or is a plush toy, the pet toys are typically made from one primary layer which defines the dominant characteristic of the pet toy in terms of its responsiveness to being chewed or otherwise played with. For example, a rubber toy with a single layer will typically deform in a uniform manner once it is chewed, and the pet toy will otherwise respond to activation by the animal in a uniform or consistent manner. If a squeaker is incorporated within the pet toy, the activation of the squeaker can also be generally defined as being uniformly responsive to activation by the animal chewing on the toy to generate sound. For plush toys, the reaction or response can also be generally characterized as being uniform or consistent, considering the toys are typically made from a single layer of material and are stuffed with a single type of material.

Considering the common forms of construction for many types of pet toys, there is a need to provide a pet toy with multiple responsive features which may help to entertain an animal longer. There is also a need to provide a pet toy that is robust enough to withstand the prolonged biting action of an animal, but is relatively simple in construction and therefore can be produced at a reasonable cost. There is also a need to provide a pet toy that has multiple responsive features that do not fall within the same general category of pet toys, which may further enhance the entertainment value of the toy for an animal.

The invention described herein overcomes many limitations in the prior art, yet incorporates a resilient, stable construction to withstand damage from prolonged biting and chewing from an animal. The invention provides multiple sources of stimulation for an animal, yet the pet toy is relatively simple in construction.

SUMMARY OF THE INVENTION

The invention includes a pet toy having a plurality of modules with distinct construction characteristics enabling the toy to provide diverse responses when an animal interacts with the pet toy. More specifically, each of the modules include a selected multiple layered construction so that the modules may generate a desired response when contacted by the animal. Multiple layers within the pet toy are elastomeric such that the toy returns to its original shape after force is applied which deforms the pet toy. Preferred embodiments include inner and outer layers or shells of material in which both layers have the ability to quickly and effectively rebound after force is applied which distorts or deforms their un-deformed states. The deformation and rebound of the pet toy generates sound from one or more sound producing elements incorporated within the pet toy. The sounds produced may occur simultaneously, at random, or in a given order.

According to a preferred embodiment, the pet toy includes an outer shell or cover, an inner shell or inner piece, and selected elements to generate sound when the pet toy is deformed. One sound generating element may include a center layer of PET placed between the inner and outer shells. According to the invention, this PET layer can produce a crackling, crunching, or crinkling sound. Another sound generating element may include a "squeaker". The term "squeaker" as used herein means a device that produces sound when air passes through it. A squeaker typically includes a thin piece of material or reed that vibrates when sound passes through the device thus generating the sound.

In one preferred embodiment, the modules may include constructions such that when one module is squeezed or deformed it produces the crackling, crunching, or crinkling sound. A second module may produce a squeaking sound by a squeaker. Another module may produce another squeaking sound that is distinct from the second module. One module may have a different elastomeric characteristic from another module, which may be selected by changing the thickness or type of material used for the inner shell or inner part of a selected module.

The squeaker may be incorporated by provision of a squeaker mounting structure which connects to an interior surface of the outer shell and extends into an interior chamber of the pet toy through corresponding openings in the inner shell and center layer. Accordingly, the squeaker can be maintained in a protected position making it more difficult for an animal to access the squeaker.

Preferably, both the inner and outer shells are made from a flexible and elastomeric material that allows the modules to elastically deform in response to pressure applied to the modules, such as the biting or squeezing action of an animal. The modules will ultimately spring back to their original un-deformed shape due to the elastomeric nature of the material used.

A plurality of modules is separated from one another and are laterally disposed in a desired configuration. In one embodiment, the modules are linearly spaced from one another. In another embodiment, the modules may be grouped together forming a triangular configuration. In another embodiment, the modules may be spaced from one another forming an irregular curved configuration. In each of the embodiments the modules are connected to one another by ribs or spacers, and the geometrical arrangement of the ribs determines how the modules are spaced from one another.

The provision of multiple modules allows an animal to selectively activate a response from the modules. For example, one animal may prefer to interact with a module that produces the crackly sound while another animal may prefer to interact with a module that produces a squeaking sound. Alternatively, an animal may be more attracted to the pet toy of the invention because there are multiple responses generated when the animal interacts with all of the modules. Regardless of the particular motivation or desires of any one animal, the pet toy of the invention provides more opportunities for an animal to achieve longer lasting and more intense interactions with the pet toy because of the modules that generate distinct responses when contacted by the animal.

Because the pet toy has multiple layers, the overall strength of the pet toy may be enhanced because the thickness of the toy is greater as compared to single layer pet toys. Additionally, because there is more than one shell or layer, this provides the pet toy designer with multiple options for creating specific characteristics as to how the pet toy deflects or deforms in response to exterior pressure. For example, it may be desired to provide a very durable, tough pet toy in which the inner and outer shells are made from high-quality rubber which is quite resilient to the biting action of an animal. In yet another example, it may be desired to provide a softer exterior surface with a more robust or strong interior shell so that there is a discernible differential in how the pet toy feels to the animal. Similarly, one or more of the modules may include ribs to alter the response of the module to exterior pressure.

According to one preferred embodiment, the inner and outer shells may be made from thermoplastic rubber (TPR). Under one general description or definition of TPR, it may be considered a thermoplastic rubber that has melting and/or molding properties of plastic while still maintaining some advantageous flexible and elastomeric properties of rubber. One distinguishing characteristic of TPR as compared to a thermoplastic elastomer or (TPE) is that a TPR may have a "shiny" or reflective side. In this regard, having one surface that is reflective may enhance the visual characteristics of the toy.

Different materials may be used to form the inner and outer shells. Preferably, the outer shell is formed of a material that is durable and of a quality to prevent teeth of an animal from penetrating the outer shell and damaging the inner shell and the intermediate layer. The outer shell may also be denser or thicker than the inner shell to provide added strength to the pet toy or to limit damage to the pet toy by the teeth of the animal.

The interior sleeve or center layer may be made from polyethylene terephthalate (PET). PET is a plastic moldable resin and is commonly used in packaging for both food and non-food items. PET is one example of a material that can produce a crackly/crinkly noise associated with the interior sleeve, and can rebound or recoil from being compressed due to its flexible and resilient characteristics.

According to another preferred embodiment of the invention, the pet toy may include a single module in which another layer is added, namely, a fabric outer cover which is positioned over and in contact with the outer shell. The fabric cover may include felt so the pet toy looks like a tennis ball type toy.

According to other preferred embodiments, the inner shell and the center noise making layer may be provided in dual half sections that are joined to one another, or in single half sections.

According to yet other preferred embodiments, the positioning of the squeaker can be modified so that it extends either along a center axis of the pet toy, or offset from this center axis in an offset position. The mounting structure which extends into the interior chamber of the pet toy can be configured to orient the squeaker so that it extends into or resides within the interior chamber at a desired orientation. For example, the mounting structure can result in the squeaker extending radially into the interior chamber, extending at an offset radial orientation, or completely residing within the interior chamber.

The specific shape of the pet toy may take many forms. Considering that the inner and outer shells may be made in a molding process, current molding technology therefore permits the molding of complex shapes so that the pet toy may take many different forms.

Although preferred embodiments disclosed herein adopt a two or three layered configuration with the inner and outer shells along with the interior or center sleeve, it is also specifically contemplated that the pet toy may incorporate additional layers or shells which may provide some additional strength and/or resilience for the toy.

According to one general method of manufacture, the pet toy may include inner and outer shells that are molded in half or bisected sections. Assembly of the half/bisected sections is achieved along matching and opposing side edges of the half sections. In order to stabilize the connection between the half sections and/or the connections between inner and outer shells of a module, as well as to increase the strength and durability of the connections, a "tongue and groove" configuration may be adopted in which one joining or abutting surface/edge includes a groove or recess, and the matching edge of the other abutting surface/edge includes a tongue or flange received in the groove/recess. While the inner and outer half sections are joined to one another, the inner or center layer is not joined to either the upper and lower sections. The inner or center layer is allowed to remain unattached in a gap or space between the inner and outer shells so that the inner/center layer is able to better generate a crackling/crinkling sound by being able to move or shift in the gap or space in response to deflection or compression of the corresponding module.

According to other aspects of the method of manufacture, two or more pieces or parts of elastomeric or natural rubber material create the outer shell. One or more PET layers create the center layer that produces the crinkling, crackling, or crunching sound. One or more parts of elastomeric or natural rubber material create the inner shell which acts as a rebounding force enabling the toy to quickly and effectively rebound to oppose external forces applied to the pet toy.

According to yet other aspects of the method of manufacture, an assembly method includes placing a half section of an inner shell within a corresponding half section of a sound producing center layer, and this two-piece assembly is then placed inside a half section of an outer shell. Next, a squeaker is positioned within the squeaker mounting structure of another half section of an outer shell. Another half of the inner shell is placed within the half section of the outer shell that includes the squeaker, and then both halves of the assembly are positioned together and wrapped with an outer fabric cover such as tennis felt. The seams of the tennis felt are covered with a special vulcanizing rubber. Next, the assembly is placed into a heated press mold where heat and pressure vulcanize the individual half sections of the inner and outer shells and vulcanize the rubber along the tennis felt seams.

To accommodate airflow in the gap or space between the inner and outer shells, one or more air or vent holes may be provided in the outer shell. In this regard, movement of air into and out of the gap between the inner and outer shells allows the center/inner layer to more easily deflect in response to contact since the gap/space itself is more easily deflected as compared to if the gap/space was sealed between the inner and outer shells.

In one embodiment, the first and second materials are made from one or more types of TPR material, and the inner or center layer is made from PET. Considering the above features and advantages of the invention, in one general aspect, the invention may be considered a pet toy comprising: (i) an outer shell and an inner shell defining an interior chamber; (ii) a center layer disposed between the inner and outer shells, the center layer being made of a sound producing material activated when the center layer is displaced in response to deformation of the outer shell; (iii) a noise making device with a first end supported by said outer shell, and a second end extending within the interior chamber; (iv) a fabric cover placed over and in contact with said outer shell.

According to additional features of this first aspect of the invention, it may further include: (i) wherein: said outer shell is molded in respective half sections and joined to assemble said pet toy; (ii) wherein: said inner shell is molded in respective half sections and joined to one another; (iii) said center layer is molded in respective half sections and joined to one another; (iv) wherein said half sections of said outer shell, said inner shell, or said center layer are each substantially symmetrical about an axis; wherein; one half section of an outer shell includes a peripheral flange projecting radially inward; and one half section of a corresponding inner shell includes an undercut that receives said flange of said outer shell; (v) wherein; said center layer has an edge that is positioned between said outer shell and said inner shell adjacent said flange and said undercut; (vi) wherein material of the outer shell has a different rigidity or flexibility as compared to the material of the inner shell; (vii) wherein the inner and outer shells have different thicknesses; (viii) wherein the inner and outer shells each include a vent opening to allow air to pass into and out from said interior chamber; and (ix) wherein the central layer includes a plurality of tiers and grooves located between said tiers, and said inner shell includes a plurality of radial protrusions that oppose said plurality of grooves.

According to another general aspect of the invention, it may include a pet toy comprising: (i) an outer shell and an inner shell defining an interior chamber; (ii) a center layer disposed between the inner and outer shells, the center layer being made of a sound producing material activated when the center layer is displaced in response to deformation of the outer shell, said center layer producing a first sound when the outer shell is deformed; (iii) a noise making device with a first end supported by said outer shell, and a second end extending within the interior chamber, said noise making device producing a second different sound when the outer shell is deformed; and (iv) a fabric cover placed over and in contact with said outer shell In connection with yet other embodiments of the invention, it includes a pet toy with two primary components, an anchor member and at least one ring shaped member. The anchor member has enlarged ends and a shaft interconnecting the enlarged ends. The at least one ring shaped member is secured to the anchor member in which the ring member has a central opening in which said shaft is inserted therethrough. The anchor member herein is illustrated in specific forms including a bone shape and a horseshoe shape. The ring member has an outer shell layer and a noise making device disposed therein. The noise making device can include a squeaker or an interior layer of material that makes a sound when the outer shell layer is compressed or otherwise deformed.

According to another aspect of the invention in accordance with embodiments of the invention, it may be considered a pet toy comprising: an anchor member having enlarged ends and a shaft interconnecting said enlarged ends; at least one ring member secured to said anchor member, said ring member having a central opening in which said shaft is inserted therethrough; said ring member having an outer shell layer and a noise making device disposed therein.

According to another aspect of the invention, it may be considered a pet toy comprising: at least one ring member having a central opening; an anchor member having enlarged ends and a shaft interconnecting said enlarged ends, said shaft inserted through said central opening and said ring member being slidable along said shaft and held between said enlarged ends; said ring member having an outer shell layer and a noise making device disposed therein.

According to yet another aspect of the invention, it may be considered a method of stimulating an animal for play with a pet toy, the method comprising: providing a pet toy comprising: at least one ring member having a central opening; an anchor member having enlarged ends and a shaft interconnecting said enlarged ends, said shaft inserted through said central opening and said ring member being slidable along said shaft and held between said enlarged ends; said ring member having an outer shell layer and a noise making device disposed therein; giving the pet toy to an animal for play; wherein the animal plays with the toy including biting the pet toy in which the at least one ring member has an elastomeric outer shell; and wherein the outer shell layer has an elastomeric response to deformation of the pet toy by the biting and other forces applied to the pet toy such that the noise making device creates a sound.

DETAILED DESCRIPTION

Figure 1:
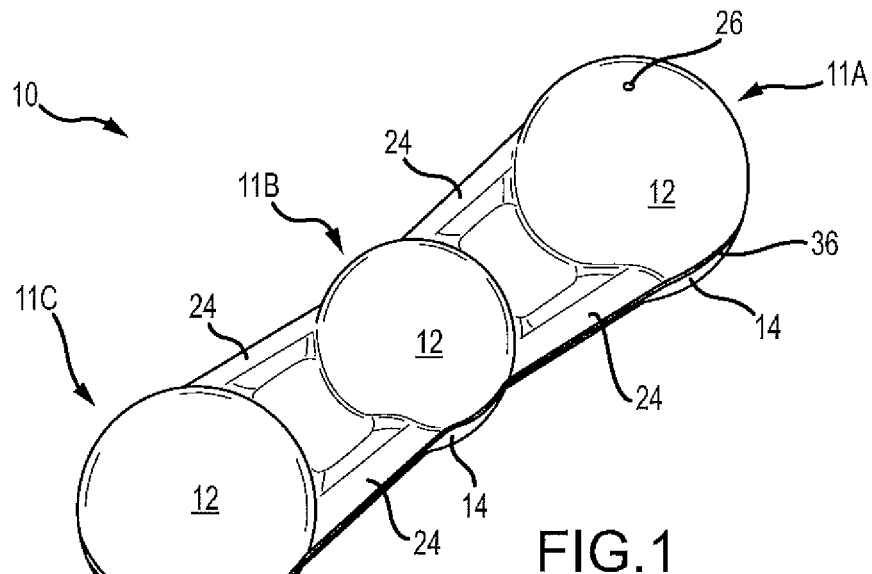
FIG. 1 is a perspective view of the pet toy in a first embodiment with a plurality of modules in a generally linear configuration.
Figure 2:
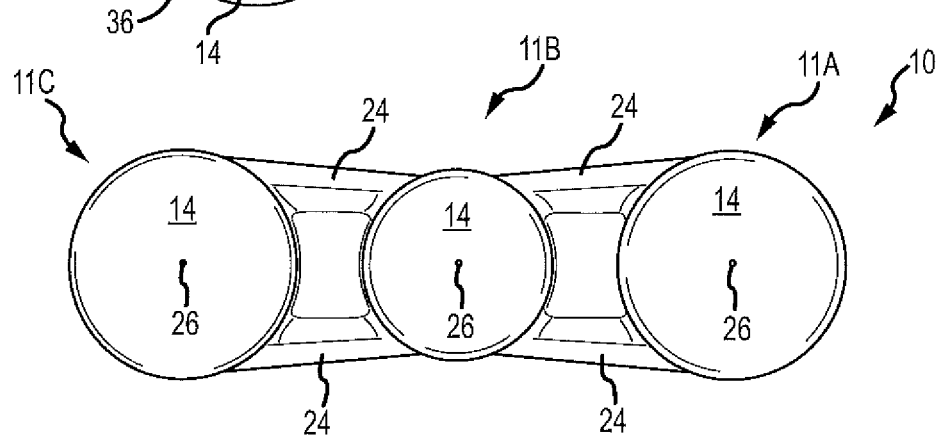
FIG. 2 is a bottom plan view of the embodiment of FIG. 1.
Figure 3:
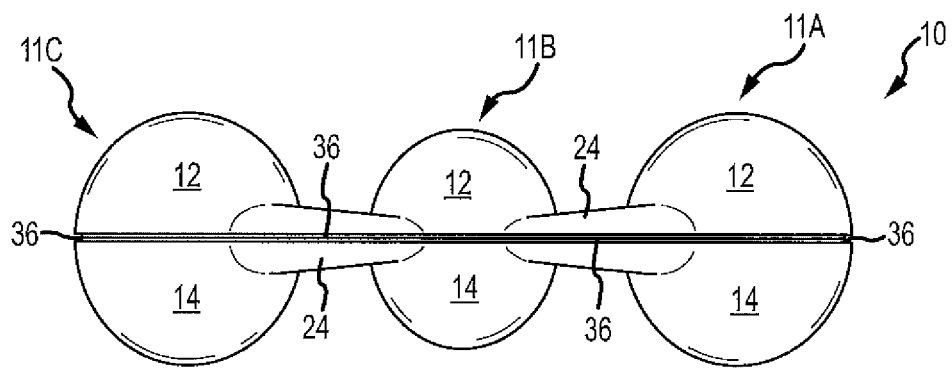
FIG. 3 is a side elevation view of the embodiment of FIG. 1.

The pet toy 10 of the invention is illustrated in a first preferred embodiment at FIGS. 1-6. The particular construction of the pet toy 10 in this first embodiment shows a multi-module configuration of three modules 11 interconnected to one another by corresponding ribs or connectors 24. One of the three modules 11A has a three layered construction with corresponding groups of half sections. The other two of the three modules 11B, 11C have a two layered construction with corresponding groups of half sections and a noise making instrument secured to the modules. Specifically, FIG. 1 shows the pet toy 10 as having three modules spaced from one another in a generally straight or linear connection in which there is a center module 11B and two opposing end modules 11A, 11C. Accordingly, there are two separate ribs or connectors 24 used to interconnect the modules 11. As also shown, the ribs may be provided in pairs in which each pair of ribs is disposed on opposite sides of the modules thereby providing a more stable or robust interconnection between the modules. Further, the pairs of ribs are shown as being disposed along midpoints of the respective connected modules; however, it shall be understood that the ribs can be modified in their location to best interconnect modules that may be of different sizes and shapes. Accordingly, in another aspect of the invention, it is contemplated that the modules in fact may have different sizes and shapes. For example, in one embodiment, the center module 11B has a size that is different than at least one of the two other modules. Optionally, the center module 11B is smaller than at least module 11A.

The module 11A with the three layers more specifically includes an outer layer or shell with upper and lower half sections 12 and 14, an inner layer or shell with upper and lower half sections 16 and 18, and an inner or center layer 20 placed in the gaps between the inner and outer shells. Optionally, interior supporting ribs or protrusions may be incorporated on exterior surfaces of the inner sections 16, 18 or on the interior surfaces of the outer sections 12, 14. The ribs may be arranged to improve the shape memory of the module 11A or alter the flexibility of the module. In this manner, the ribs may improve the ability of the module 11A to return to an un-deformed state after biting by an animal. The protrusions may provide a predetermined amount of separation between the inner section 16, 18 and the outer section 12, 14. Additionally, the sound produced by the center layer 20 may be altered as the layer contacts the protrusions.

Figure 4:
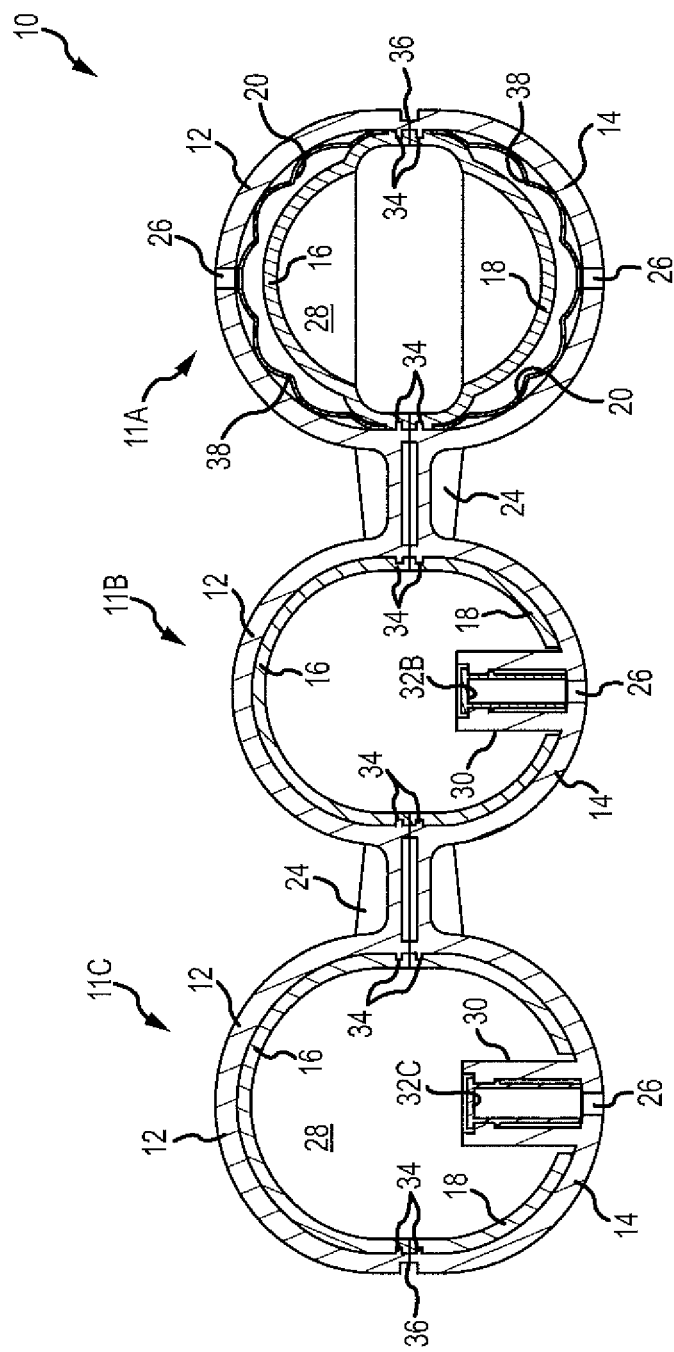
FIG. 4 is a cross-section of FIG. 3.
Figure 5:
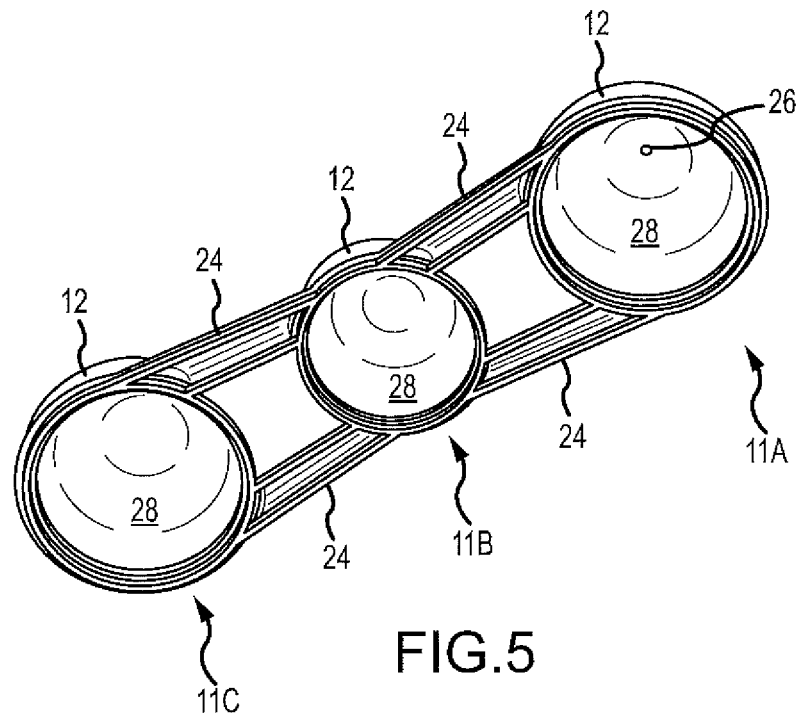
FIG. 5 is a perspective view of an upper half or upper portion of the pet toy of FIG. 1 showing interior details thereof.
Figure 6:
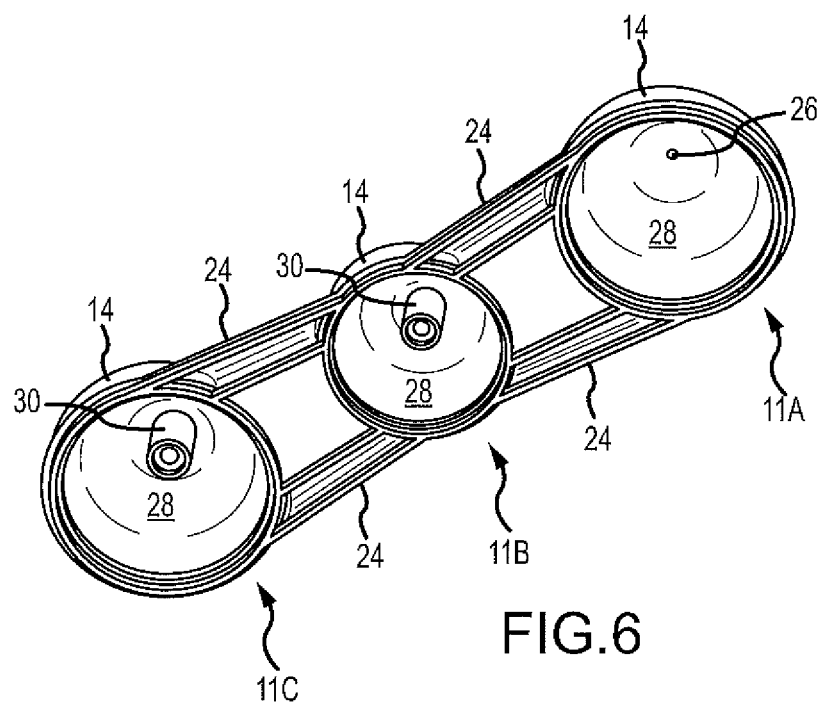
FIG. 6 is a perspective view of a lower half or lower portion of the pet toy of FIG. 1 showing interior details thereof.

These layers or shells are provided in the half sections that are joined to one another along facing edges or joining surfaces as best shown in FIGS. 5 and 6. The inner layer 20 has respective upper and lower half sections as best seen in FIG. 4 that are not connected to one another. The upper and lower half section of the inner layer 20 may be substantially identical. Accordingly, each half section of the inner layer 20 may independently move or displace within the corresponding gap located between the outer shell half sections 12, 14 and inner shell half sections 16, 18. Openings 26 are provided on both of the half sections 12, 14 that allows air to pass into and out of the gaps between the inner 16, 18 and outer 12, 14 shells. This dual vented configuration allows the outer shells to more easily collapse against the corresponding inner layers 20 to produce sound as the inner layer is also deflected or otherwise undergoes a change in shape.

The outer section 12, 14 may be formed of a material that is translucent or substantially transparent. The material of the inner lay 20 may thus reflect light at multiple angles from the tiers 38 through the outer sections 12, 14 as an animal plays with the toy.

The other two modules 11B, 11C are illustrated as having two layered constructions with corresponding groups of half sections to include the outer shell half sections 12, 14 and the inner shell half sections 16, 18. Interior surfaces 28 of the inner section 16, 18 define an interior space or chamber within the modules 11B, 11C. These other two modules are illustrated as each further having a noisemaking device such as a squeaker 32 located within their chambers. As seen in FIG. 4, an interior mount 30 extends into the chamber of each module. The mount 30 has a generally cylindrical shape with a bore or opening that extends axially through the mount. An opening at the distal (or interior) end of the mount 30 connects to the bore. The squeaker 32 is secured within the bore of the interior mount 30 in a generally suspended or supported position within the chamber such that the squeaker is located in a protected position from contact by an animal. Another opening 26 in the outer shell 14 allows a pathway for air to pass through the squeaker 32 and to communicate with the interior chamber within the module. As a module changes in shape due to compression forces imposed upon it by an animal or owner, air is able to pass in and out of the interior chamber to produce sound by corresponding air movement through the squeaker. From this supported or suspended position, the squeaker 32 is able to pass air so that a consistent noise can be generated from the squeaker whenever the pet toy is squeezed or otherwise deformed.

As also shown in FIG. 4, the squeaker 32 is able to maintain a spaced and suspended relationship with the interior surface 28 of the corresponding module to more reliably generate sound as compared to if the squeaker was mounted in contact with the interior surface. If the squeaker was mounted against the interior surface, operation of the squeaker might become inhibited if compression of the toy resulted in blocking flow of air through the squeaker. Further, because the squeaker 32 is positioned within the mount 30, the biting action of an animal does not result in direct contact of the animal's mouth with the body of the squeaker.

Optionally, the mount 30 is flexibly connected to the outer section 14. The flexible nature of the connection between the mount 30 and outer section 14 allows the mount to collapse against the interior surface 28 of the module. In this manner, the interior surface 28 of the chamber will not cover the opening at the distal end of the mount 30 which would prevent the noise maker 32 from making noise. The noise making device 32 can also flex or bend along the point at which the mount 30 attaches to the outer section 14. As a consequence, in the event of excessive deformation of the module 11 resulting in contact of the interior surface 28 of the module chamber with the mount 30, the mount 30 can flex or bend to prevent damage to the noise making device.

In one embodiment, illustrated in FIG. 4, the mount 30 is formed by a portion of the lower half section 14. However, it will be appreciated that the mount may be arranged differently within the module. For example, in another embodiment, the mount 30 comprises two substantially equal half sections extending inwardly from each of the outer shell half sections 12, 14. Said another way, the mount 30 may be positioned proximate to the joining surface of the half sections 12, 14 and generally aligned with a plane formed by the joining line 36. Optionally, in one embodiment, the mount 30 is positioned proximate to a rib connector 24. In this way, the squeaker 32 within the mount 30 may be protected from damage caused by biting of the animal. Further, the rib 24 may prevent removal of the squeaker 32 from the mount by the animal. In another embodiment, a portion of the inner sections 16, 18 may wrap at least partially around the exterior of the mount 30. In this manner, the squeaker may be further protected from damage.

In one embodiment, also illustrated in FIG. 4, the mount 30 extends generally radially into the interior of the chamber. However, it will be appreciated that the mount may extend at an angle into the interior. Accordingly, in one embodiment, the mount 30 is not orthogonal to a line tangent to one of the half sections 12, 14. In another embodiment, the mount extends at an angle of approximately 45 degrees into the chamber. Because of the angle at which the mount 30 extends into the chamber, the distal end of the mount 30 is not parallel to the interior surface 28. As a consequence, deformation of the module 11 causing contact of the interior surface 28 with the mount 30 will not result in the interior surface 28 making flush contact with the opening in the distal end of the mount 30. Thus, the angular orientation of the mount 30 may prevent the interior surface 28 of the chamber from sealing the bore through the mount 30 if the interior surface 28 contacts the mount 30 as the module 11 is compressed by play of the animal. Accordingly, airflow will continue through the opening in the housing despite the deformation experienced along the sidewall. Alternatively, the mount 30 may be formed with a distal end formed at an angle that is not perpendicular to the cylindrical body. Optionally, a series of bumps may be formed on the distal end of the mount 30 to prevent the distal end from being completed obstructed by contact with the interior surface 28.

Although the mounts 30 of modules 11B, 11C are illustrated as being in substantially the same locations and orientations, it will be appreciated that the mount of each module may be located in different areas. In this manner, the toy 10 may make noises in more situations, or the squeakers may be non-uniformly activated. Further, the noise may come from two different directions which may enhance the interest of the animal and stimulate further play. Accordingly, in one embodiment, the openings 26 for the mounts 30 are located on different sides of the modules 11B, 11C. In one embodiment, the mounts 30 of modules 11B, 11C are not parallel. Optionally, the mounts of modules 11B, 11C are substantially perpendicular.

Each of the shells/layers has complementary shapes such that when the pet toy is assembled, the shells/layers remain in a nested or concentric configuration. Further, the shells/layers may have similar or different cross-sectional thicknesses to accommodate desired variances in elastomeric rebound in response to compression forces imposed upon the toy. Accordingly, it is contemplated that the inner 16, 18 and/or outer 12, 14 shells may be of different thicknesses to match a desired degree of deflection that occurs in response to a predetermined amount of compression force applied. Each module 11 may also have a different color. Similarly, the exterior surfaces of the modules may have different textures or include protrusions, depressions, grooves, or combinations thereof. Thus, the modules may provide different surfaces that are easier or more difficult for an animal to bite to stimulate additional play from the animal. In one embodiment, one module is substantially smooth and another module has a rough surface. In another embodiment, at least one module has a plurality of bumps or depressions. In still another embodiment, one of the modules has an exterior surface that is softer or more pliable than the other modules.

The inner and outer shells may be joined to one another along their corresponding joining surfaces by a mating or connection arrangement. In FIG. 4, the connecting arrangement resembles a "tongue in groove" connection 34 in which the upper half section of the outer shell 12 incorporates a tongue or extension, and the corresponding upper half section of inner shell 16 incorporates a groove or recess to receive the tongue/extension. This tongue and groove type connection may extend around the entire periphery of the joining surfaces. Alternatively, the tongue and groove connection may be incorporated only upon selected sections of portions of the joining surfaces. Similarly, as illustrated, the lower half sections of the inner 18 and outer 14 shells, as shown, may also incorporate a desired mating or connection arrangement such as a "tongue in groove" connection 34.

The assembled inner and outer shell half sections may be joined along joining line or interface 36, as also shown in FIG. 4, by any suitable method. For example, in one embodiment, the half sections may be joined by heat welding, by an acceptable food grade adhesive, or combinations thereof. This joining line or interface 36 also extends across the connecting ribs 24 such that the corresponding upper and lower half sections can also be conveniently joined along a single and substantially planar connecting surface. Optionally, in one embodiment, the joining surfaces along the connection 34 include a protrusion of one of the outer portions 12, 14 that is retained by a recess or cavity of the other outer portion 14, 12. Accordingly, when the two outer portions 12, 14 are pressed together, the protrusion fits into the recess to interconnect the outer portions together. In this manner, protrusion and the recess may be used to form, or supplement, a joint between the assembled inner and outer shell half sections.

Figure 7:
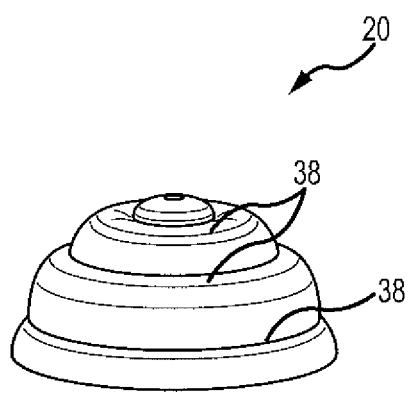
FIG. 7 is a perspective view of an upper portion of an inner part of one embodiment showing the particular shape thereof; a lower portion being substantially identical to the upper portion according to the first embodiment.

Referring to FIG. 7, one of the interior sleeves 20 is illustrated. As shown, the sleeve 20 has a multi-tiered shape as defined by separating lines or tiers 38. According to this shape, the sleeve is capable of collapsing along multiple planes or areas when the outer shell is deflected. The collapsing of the sleeve 20 generates a crackling or crinkling sound that may stimulate an animal. Further, because the sleeve is provided in the multi-tiered shape, it is capable of collapsing along different levels or areas so that deflection of the outer shell along various locations will still result in some type of collapse of the sleeve thereby producing a sound. Additionally, or alternatively, ridges or bumps may be formed on the sleeve 20 to alter, or increase, the sound produced as the sleeve is bent or compressed between the inner 16, 18 and outer 12, 14 sections.

Figure 8:
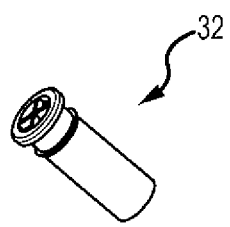
FIG. 8 is a perspective view of an example noisemaking device that may be used with the invention.
Figure 9:
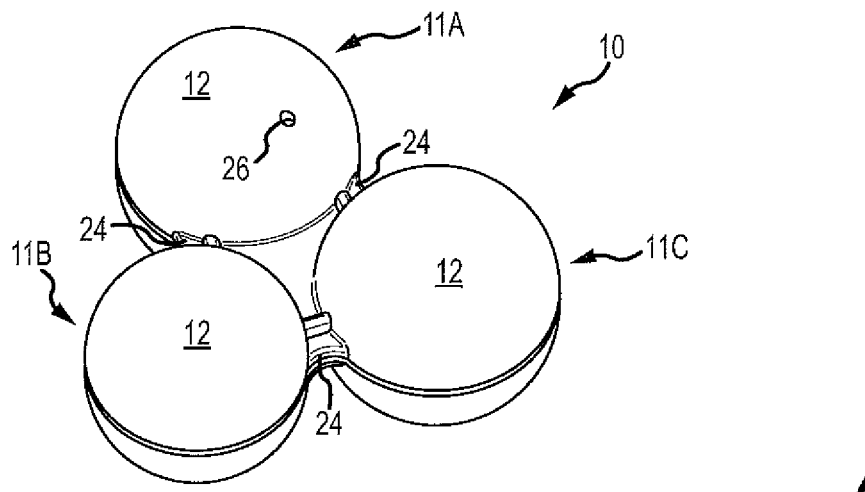
FIG. 9 is a bottom perspective view of the invention in a second preferred embodiment comprising a plurality of modules in a generally triangular configuration.
Figure 10:
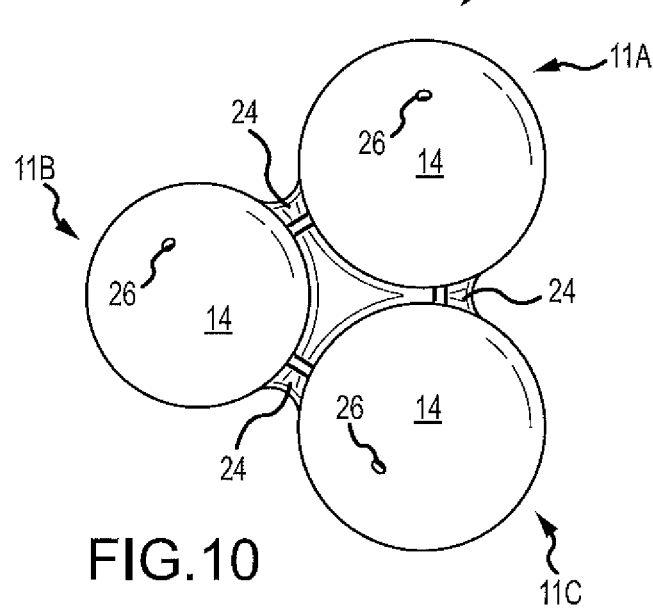
FIG. 10 is a top plan view of the embodiment of FIG. 9.
Figure 11:
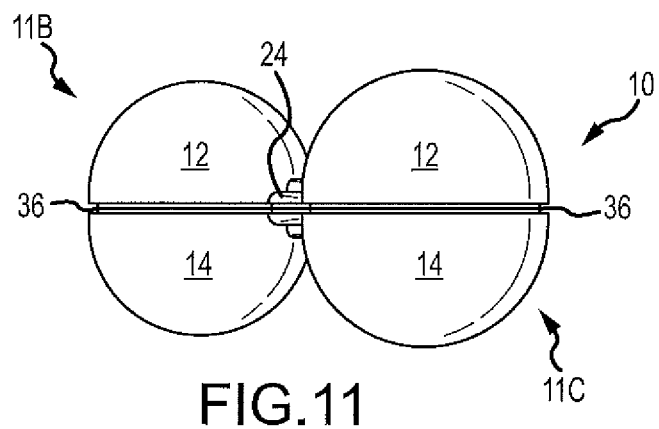
FIG. 11 is a side elevation view of the embodiment of FIG. 9.
Figure 12:
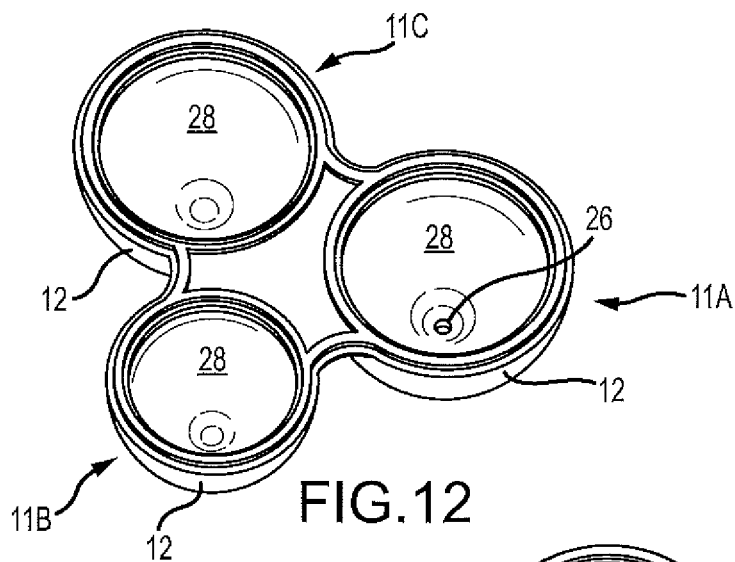
FIG. 12 is a perspective view of an upper half or upper portion of the pet toy of FIG. 9 showing interior details thereof.
Figure 13:
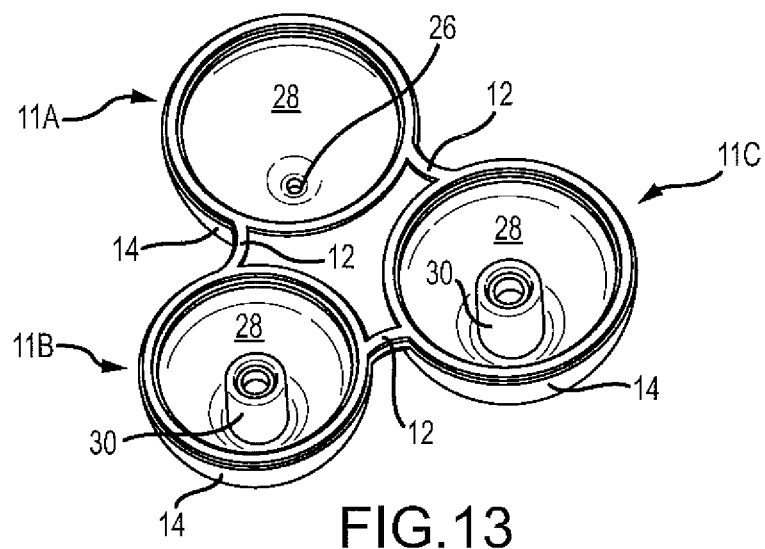
FIG. 13 is a perspective view of a lower half or lower portion of the pet toy of FIG. 9 showing interior details thereof.
Figure 14:
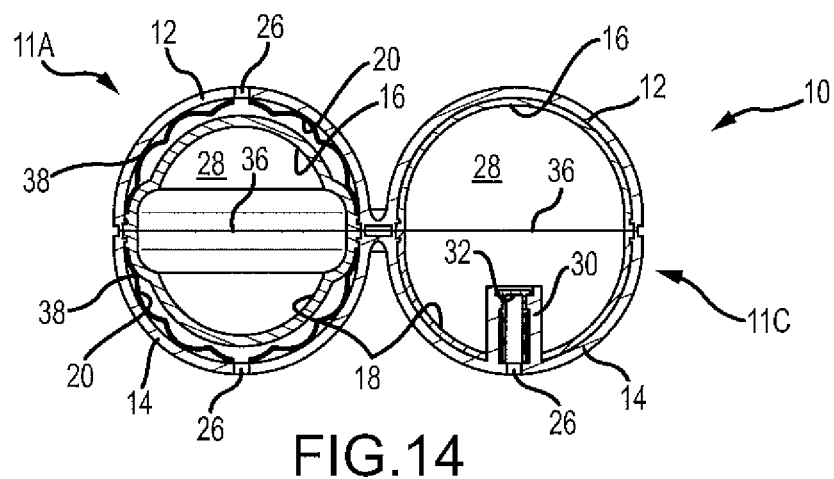
FIG. 14 is a cross-section of FIG. 11.
Figure 15:
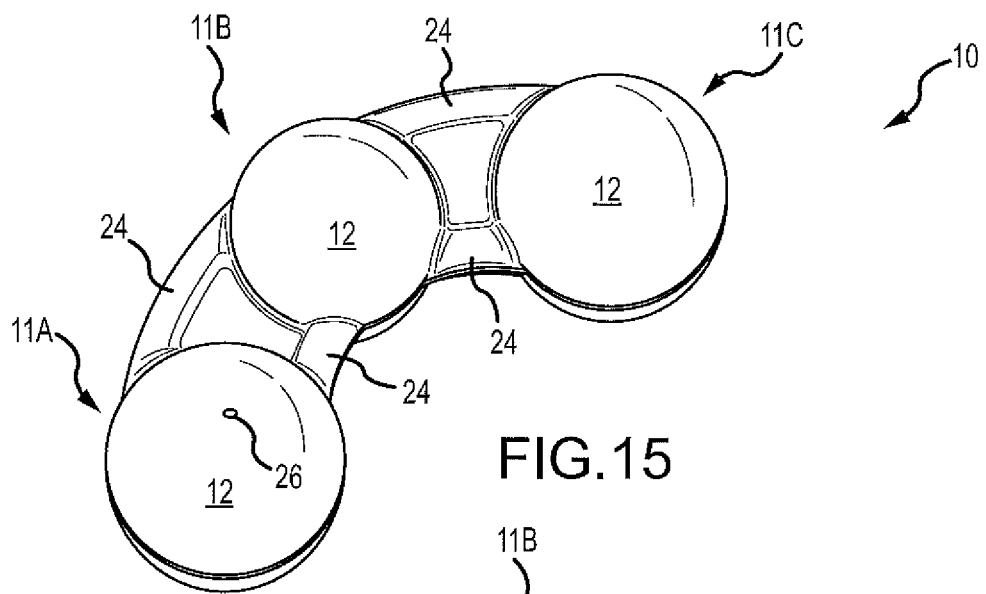
FIG. 15 is a top perspective view of the invention in a third preferred embodiment including a plurality of modules in a generally curved configuration.
Figure 16:
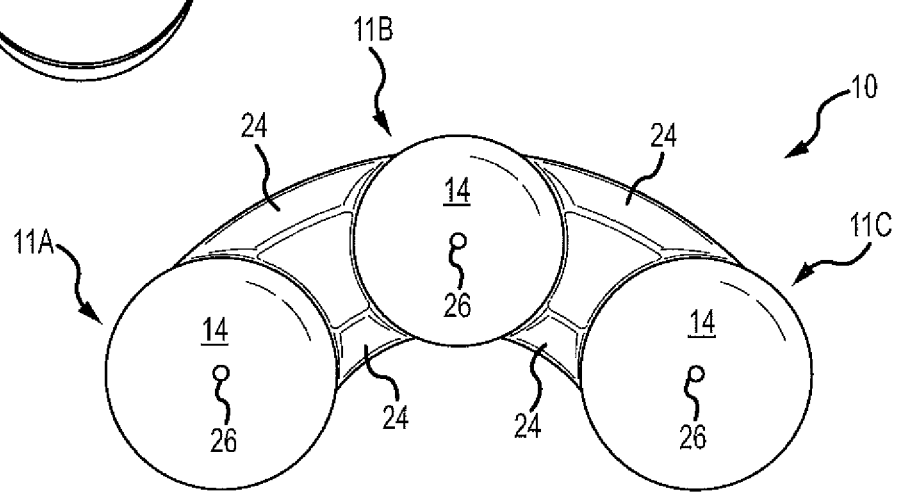
FIG. 16 is a bottom plan view of the embodiment of FIG. 15.
Figure 17:
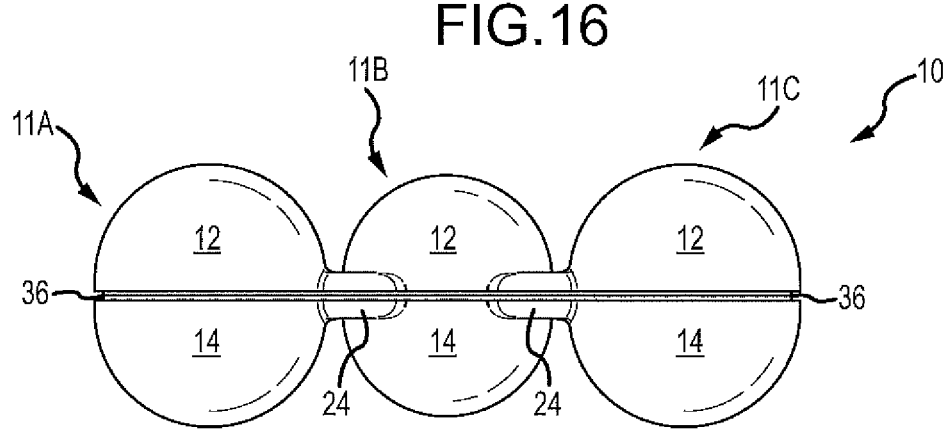
FIG. 17 is a side elevation view of the embodiment of FIG. 15.

Referring now to FIG. 8, an embodiment of a noise making device 32 is shown. The noise making device 32 can be a conventional squeaker used in pet toys. The squeaker may include a noise producing element, such as a flexible reed (not shown). The reed is mounted in the squeaker in such a manner that as air flows around the reed, the reed vibrates and generates a noise. The noise making device 32 may be of any desired length or diameter. In one embodiment of the present invention, the noise making devices 32 in each module produce different sounds. For example, in one embodiment, the noise maker 32B in module 11B has at least one of a different length and diameter than the noise maker 32C in module 11C. Optionally, reeds of different materials or lengths may be used to produce different sounds. Other noise making devices can be used, and based on the space available in the hollow interior 26, the housing 30 can be sized and shaped to accommodate the particular noise making device chosen.

Referring to FIGS. 9-14, another embodiment of a toy 10 is illustrated in which the modules 11 are placed in a generally triangular configuration by three ribs 24. This embodiment also adopts a construction in which at least one of the modules has a three layered construction, and at least one of the other two modules has a two layered construction that incorporates a noisemaking device such as a squeaker. The same reference numerals used in this embodiment correspond to the same structure described with respect to the first embodiment. Two of the modules 11A, 11C have a similar size and shape and the third module 11B has a similar shape but is of a smaller size. More specifically, two of the modules 11A, 11C are shown as larger spherical elements and the third module 11B is shown as a smaller spherical element. As mentioned, it is contemplated that the modules may be of different sizes and/or shapes.

Figure 18:
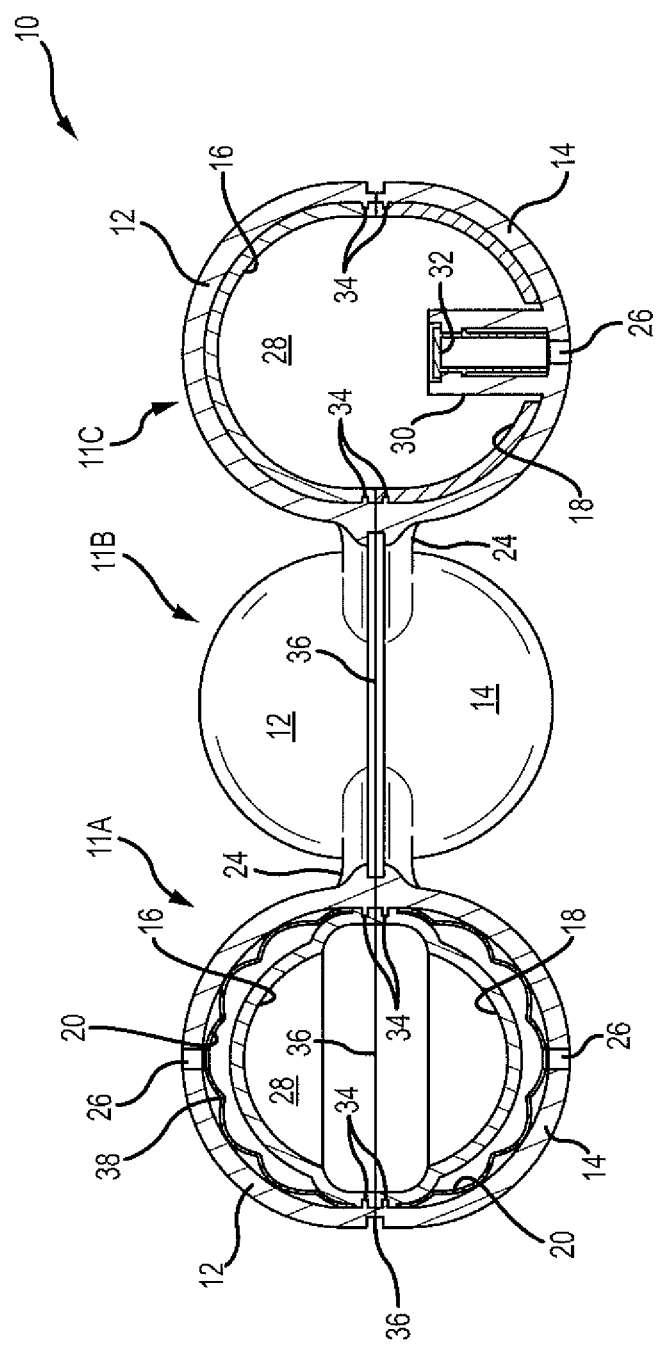
FIG. 18 is a cross-section of FIG. 17 with the plane of the cross-section intersecting two of the modules.

Referring to FIGS. 15-18, another embodiment is illustrated in which the modules 11 are placed in a curved configuration as determined by the arrangement of the ribs 24. This embodiment, as seen in FIG. 18, also adopts a configuration in which at least one of the modules, module 11A, has a three layered construction and at least one of the other two modules, for example, module 11C, has a two layered construction that incorporates a noisemaking device such as a squeaker 32. Again, the same reference numerals used in this embodiment correspond to the same structure described with respect to the first embodiment. The modules in this embodiment are shown as three similarly sized spherical elements with two pairs of ribs 24 that interconnect the modules. However, it will be appreciated that one of the modules may be of a different size. For example, in one embodiment, the middle or medial module 11B is a different size than the other modules 11A, 11C. In one embodiment, module 11B is smaller than at least one of the other module.

Figure 19:
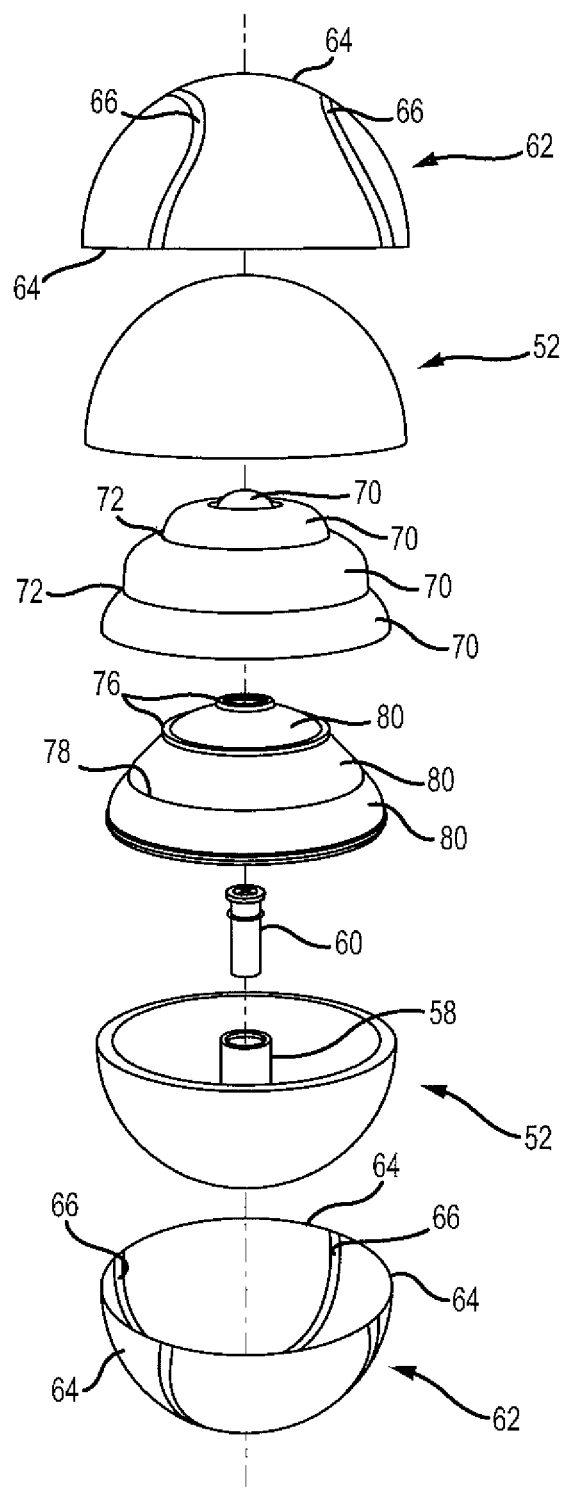
FIG. 19 is an exploded perspective view of another preferred embodiment of the invention.

Referring to FIG. 19, another preferred embodiment of the invention is illustrated. This preferred embodiment shows a pet toy with a single module including an outer shell 52, and inner shell 56, and a center noise making layer 54. The inner shell 56 and center layer 54 are shown in single half sections encompassing only the upper half of the pet toy. The lower half of the pet toy includes a squeaker mounting structure 58 for mounting a squeaker 60 therein.

This preferred embodiment further shows an outer fabric layer 62, shown in the form of a tennis ball cover characterized by fabric portions including felt material 64 and seams 66 that may be made of a rubber material.

Figure 20:
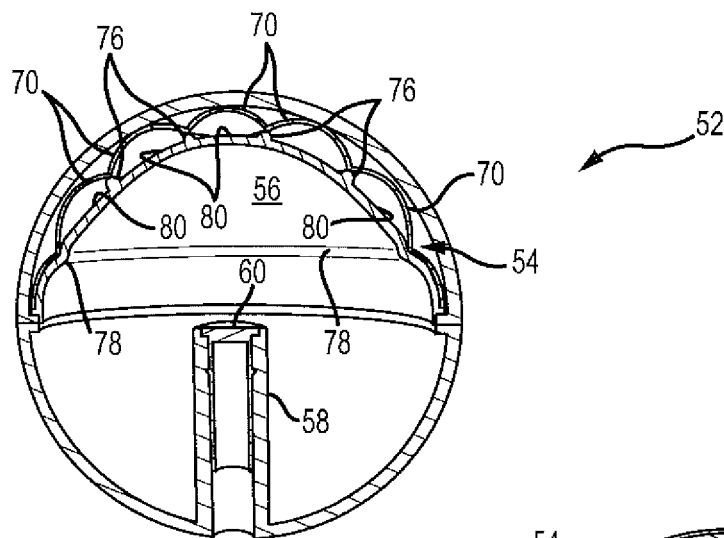
FIG. 20 is a cross-sectional view of the pet toy of FIG. 19 without the fabric cover.

Referring also to FIG. 20, the inner shell 56 and center layer 54 are illustrated as having additional features which may contribute to producing sound, as well as providing greater resiliency for the pet toy to rebound to its original shape after being deformed by force, such as the biting action of an animal. Specifically, the center noisemaking layer 54 is illustrated as having a plurality of convex shaped tiers 70 with corresponding grooves 72 defined between adjacent tiers 70. For the inner shell 56, it has a number of complementary features including a plurality of annular protrusions 76, convex shaped tiers 80, and a single annular groove 78. As shown in FIG. 20, the alignment of these features results in a robust construction for the pet toy in which the rebounding capability of the pet toy is maximized, as well as the construction in which the center layer is firmly anchored between the inner and outer layers. Specifically, the single groove 78 of the inner layer 56 aligns with the lower groove 72 of the center layer 54. Accordingly, the lower convex tier 70 of the center layer and the lower convex tier 80 of the inner shell overlap so the center layer may be effectively held between the abutting inner and outer shells.

Above the aligned lower grooves 72 and 78 are the remaining grooves 72 and annular protrusions 76. These features also align with one another in which the protrusions 76 abut the grooves 72 as shown. According to this configuration, even slight deformation of the outer shell results in a corresponding deformation or movement of the center layer. Gaps between the inner and outer shells and center layer is minimized since the protrusions 76 urge the grooves 78 radially outward. In other words, there is a tight fit of the center layer 54 between the inner shell 56 and outer 52 shell enhanced by the aligned relationship of the various grooves 72 and protrusions 76. Because the center layer 56 will be deformed even with slight deformation of the outer shell 52, the center layer 54 will produce sound. Accordingly, this reliable sound producing mechanism of the invention ensures there is a continual audible response by the pet toy when force is applied to it.

With respect to both the squeaker and center layer producing sound, it is contemplated that both can produce sound simultaneously or sequentially. For example, the particular construction of the squeaker can be such that even slight air flowing through the squeaker will cause the squeaker to produce sound in conjunction with the relatively sensitive sound producing capability of the center layer which may produce sound even with slight deformation of the inner shell. In this first scenario, the sounds can therefore be produced simultaneously. Conversely, the particular construction of the squeaker can be such that much greater air is required to cause the squeaker to produce sound such that the center layer will produce sound first upon initial deformation of the pet toy, and assuming great enough force is applied, the squeaker will then produce sound. According to the second scenario, the sounds are therefore produced sequentially.

Figure 21:
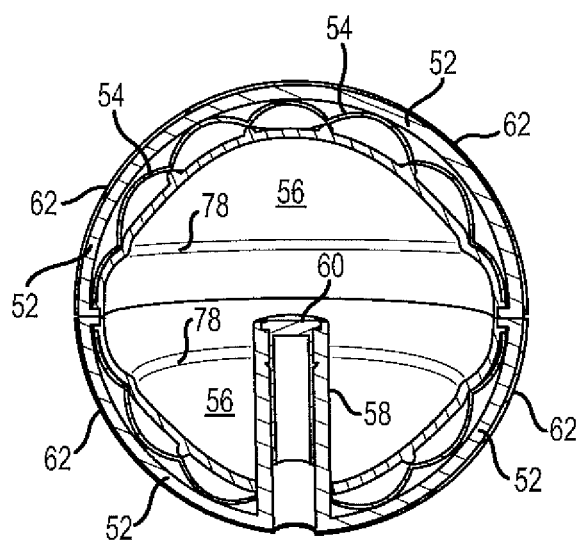
FIG. 21 is a cross-sectional view of the pet toy of FIG. 19 and further illustrating lower elements of the inner shell and noise-making sleeve.

Referring to FIG. 21, the pet toy of FIG. 20 is modified to include both a lower half section for the inner shell 52 as well as a lower half section for the center layer 56. Therefore, deformation anywhere along the outer surface of the pet toy may result in sound being produced by the center layer whereas in the embodiment of FIG. 19, the center layer will only produce sound if the upper half of the toy is engaged by force. It is therefore contemplated that incorporation of the center sound producing layer can be provided on only a selected half section of the pet toy, or both half sections.

Figure 22:
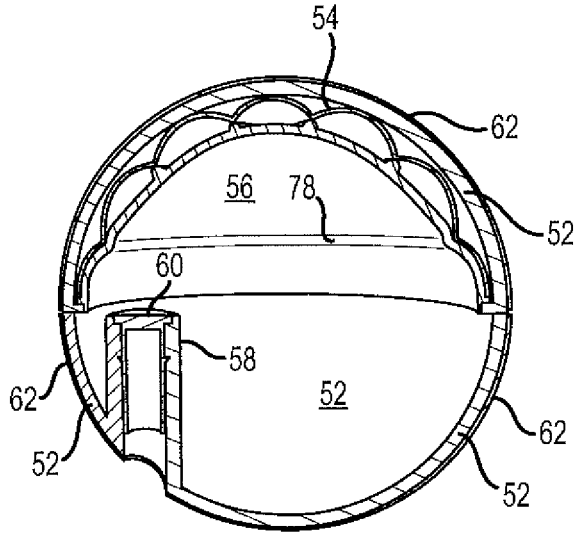
FIG. 22 is another sectional view of the pet toy of FIG. 19 showing an alternate off-set position for the squeaker.

Referring to FIG. 22, another preferred embodiment of the invention is illustrated in which the squeaker mounting structure 58 is shifted so that it does not align with a central axis of the pet toy. As shown according to the view of FIG. 22, the mounting structure 58 is shifted to the left such that the squeaker is moved off center. It may be advantageous for selectively shifting the squeaker mounting structure and squeaker depending upon the particular shape of the pet toy and the available space within the interior chamber of the pet toy to receive the squeaker.

Figure 23:
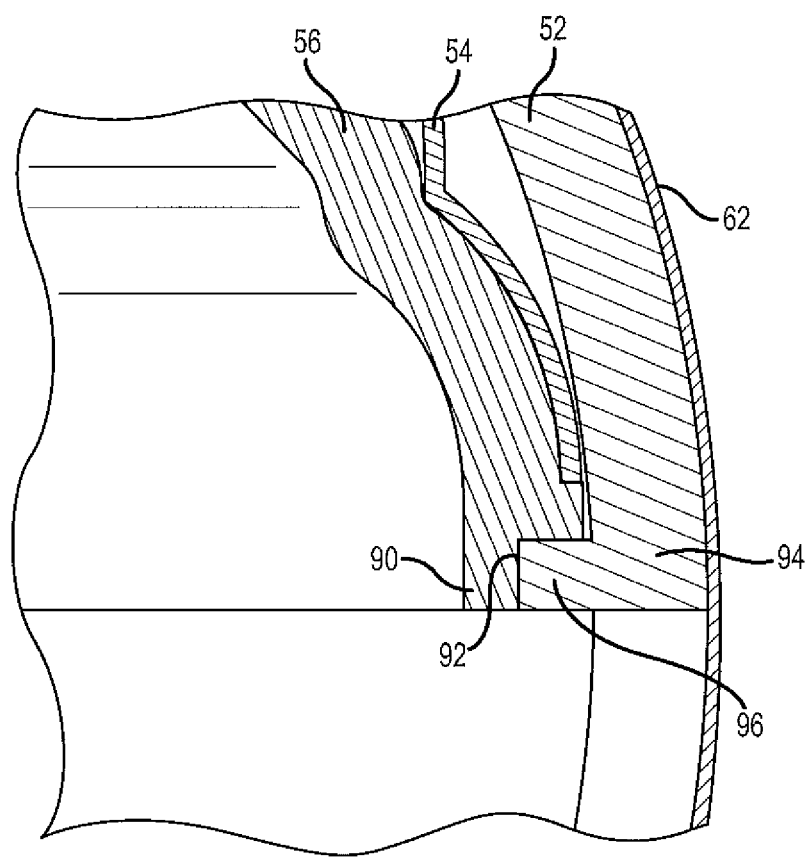
FIG. 23 is an enlarged partial cross-sectional view of the pet toy of FIG. 19 showing the interface or connection between upper and lower elements of the toy.

Referring to FIG. 23, additional detail is illustrated with respect to how the inner shell, 56, outer shell 52, and center layer 54 may be disposed with one another to create a reliable connection. As shown, a lower radial edge 90 of the inner layer includes an annular undercut 92. A lower radial edge 94 of the outer shell includes a peripheral flange 96 which is received within the annular undercut 92. In the event that there are both upper and lower half sections for an inner shell incorporated within the pet toy, then the lower half section of the corresponding outer shell and the corresponding half section of the lower inner shell may also include the same arrangement, namely, a peripheral flange received within an annular undercut.

Figure 24:
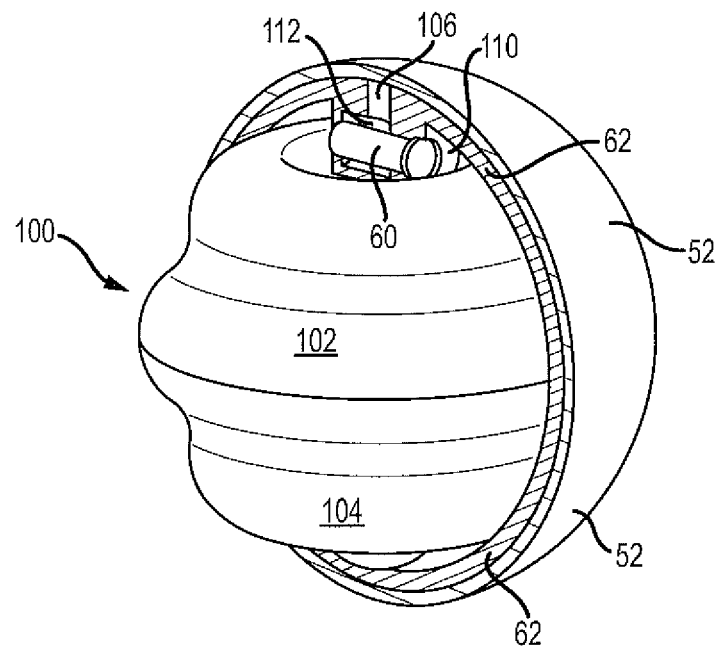
FIG. 24 is a partial cross-sectional view of the pet toy in yet another embodiment illustrating an inner shell of a different configuration and an alternate construction for mounting of a squeaker.
Figure 25:
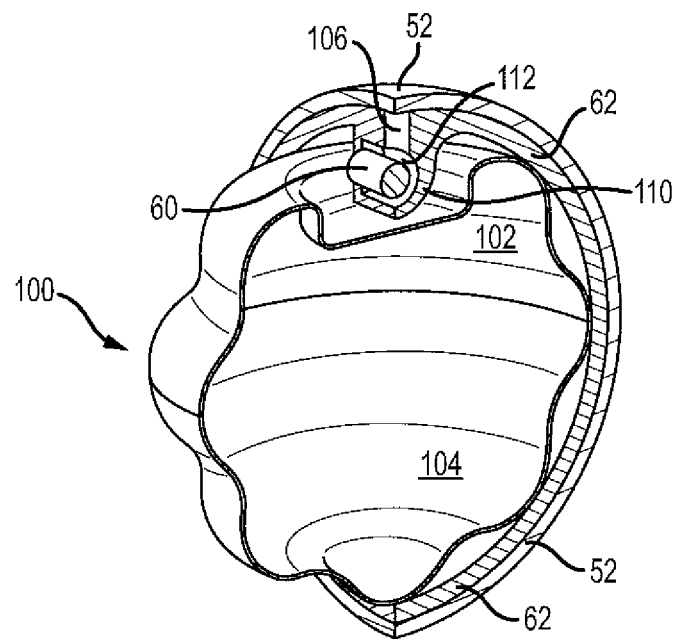
FIG. 25 is a cross sectional view of the pet toy of FIG. 25 showing additional details of the interior of the toy.

Referring to FIGS. 24 and 25, yet another preferred embodiment of the invention is illustrated in which there is an inner shell 100 of a different shape including both upper and lower half sections 102 and 104. No center layer is shown, but it shall be understood that a center layer may also be added. A modified squeaker mounting structure 110 is illustrated having its chamber or central opening 112 disposed in an orthogonal or perpendicular manner as compared to the mounting structure of the other embodiments. In this way, the entire squeaker is suspended within the interior chamber of the pet toy. A passageway 106 provides air intake and expulsion from the interior chamber of the pet toy. It may be desirable to place the squeaker in this position to provide better protection so that it is made yet more difficult to access by an animal.

Figure 26:
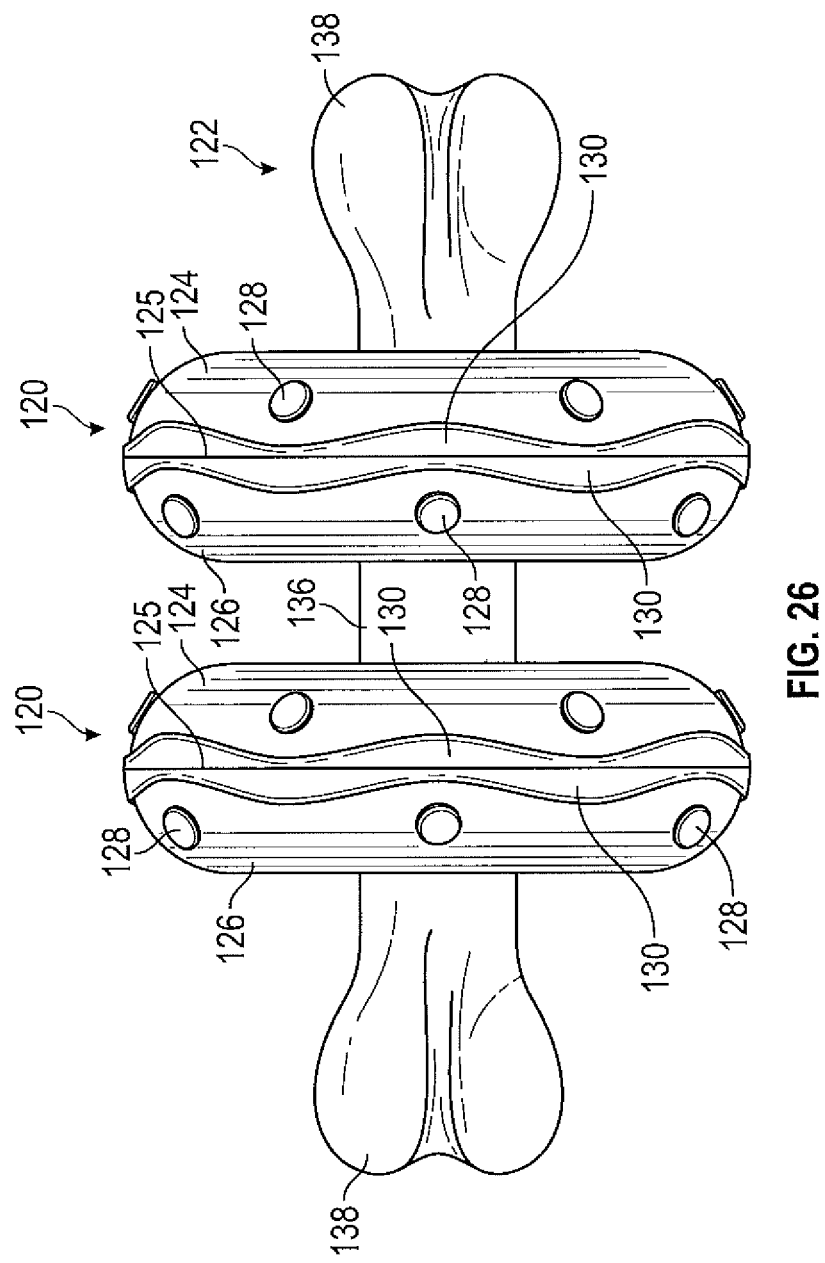
FIG. 26 is a side elevation view of another preferred embodiment.
Figure 27:
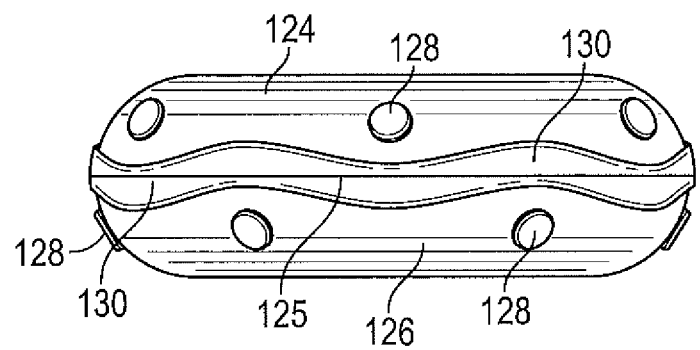
FIG. 27 is a side elevation view of one of the ring shaped elements of FIG. 26.
Figure 28:
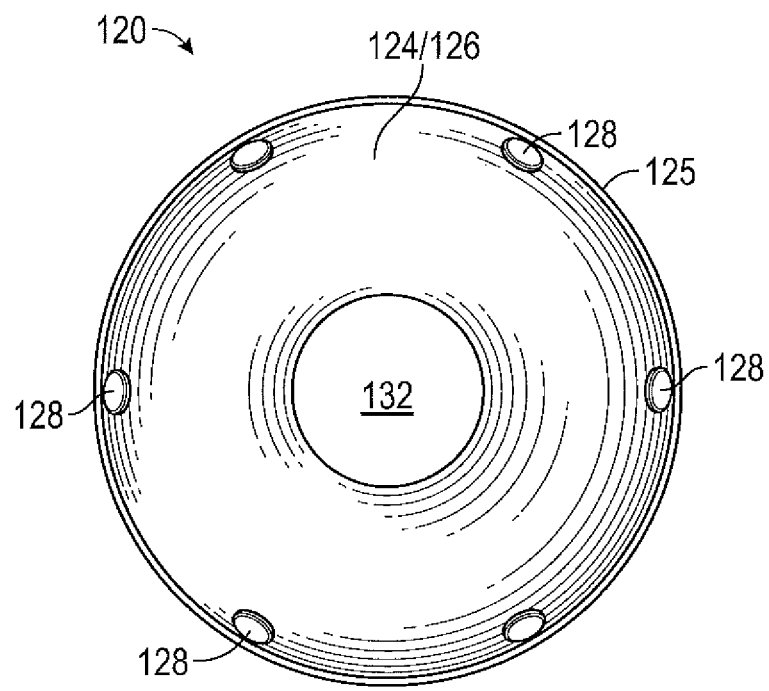
FIG. 28 is a plan view of the ring shaped element of FIG. 26
Figure 29:
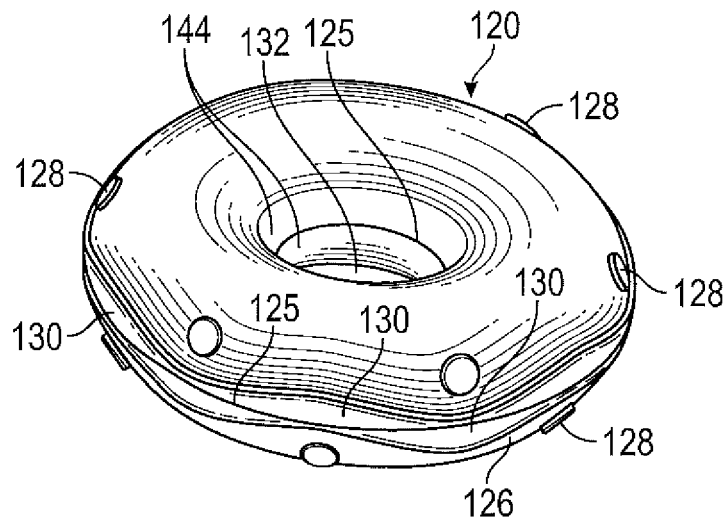
FIG. 29 is a perspective view of the ring shaped element of FIG. 26.
Figure 34:
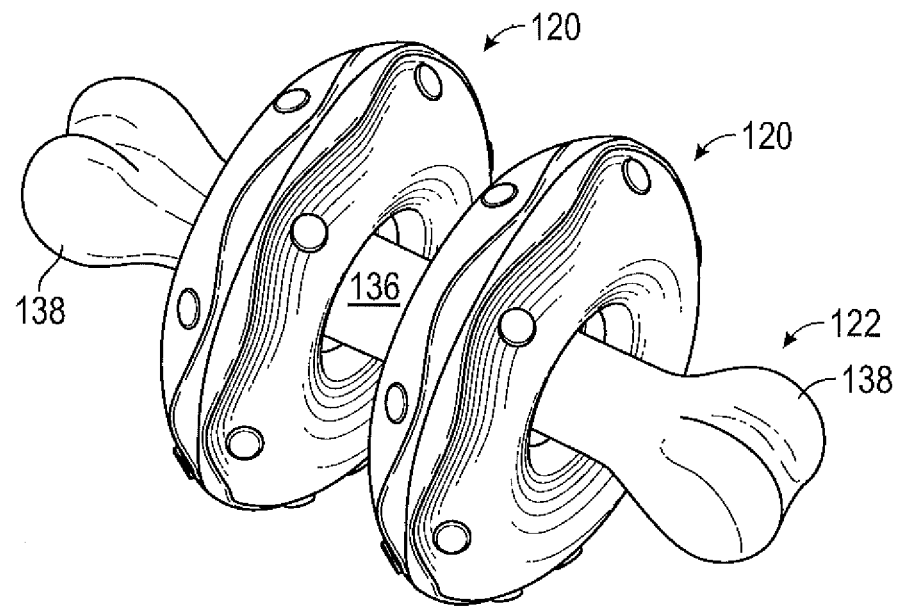
FIG. 34 is a first perspective view of the embodiment of FIG. 26.
Figure 35:
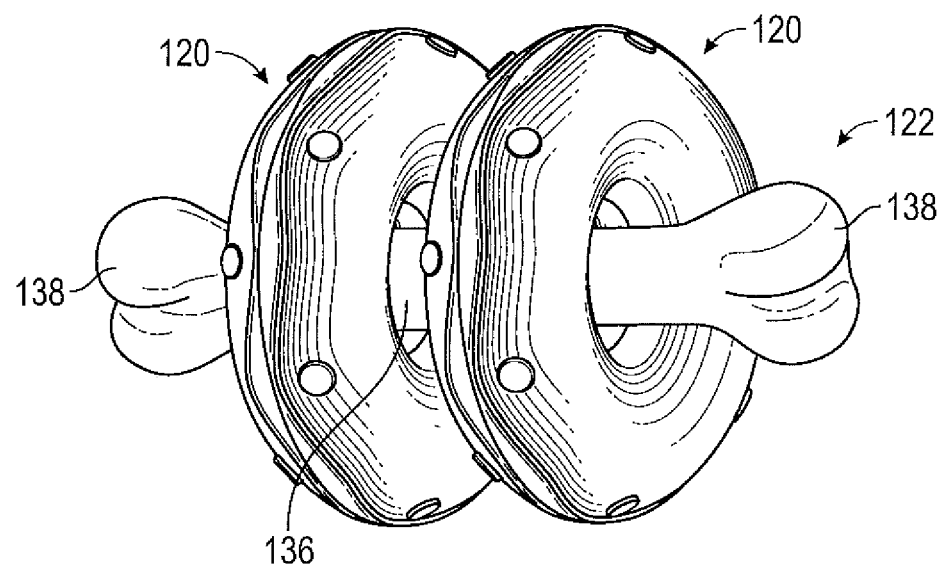
FIG. 35 is a second perspective view of the embodiment of FIG. 26.

FIGS. 26, 34 and 35 illustrate yet another preferred embodiment of the invention comprising one or more ring or donut-shaped members 120 and an anchor in the shape of a bone shaped member 122. The ring members 120 are shown as being engaged with a shaft of the bone shaped member, that is, the shaft of the bone is inserted through central openings of the ring members. The bone shaped member may be more broadly defined as a base or anchor element in which a shaft of the anchor is inserted through the ring shaped members, and enlarged end members of the anchor prevent the ring shaped members from being removed. The term "ring shaped" as used herein should be broadly interpreted to not only include a donut-shaped element, but also any shaped element in which there is a centered opening to receive the shaft of the bone shaped member Also referring to FIGS. 27-29, the ring members 120 can be generally characterized as having an outer shell or outer layer comprising two half sections 124 and 126. The half sections are separated along a part line 125. A plurality of optional exterior features may be added to the half sections, shown as a plurality of protrusions or bumps 128 and a wave shaped raised area 130 that traverses across the circumference of the ring members. The bone shaped member 122 is generally characterized as having opposing ends or balls 138 such as associated with ball and socket joints of bones, and the balls interconnected by a bone shaft or section 136.

According to one aspect of this embodiment, the bone shaped member 122 can be constructed of a relatively harder, stiff plastic material as compared to the ring members 120 that are compressible by virtue of the one or more flexible and elastic/elastomeric layers making up the ring members, as discussed below with respect to FIGS. 30 and 32. The ring members 120 each have the central opening 132 to receive the bone shaft 136, and the diameter of the central opening 132 is preferably smaller than the effective diameter of the balls 138 so the ring members 120 therefore remain secured between the balls, yet may loosely slide along the shaft 136.

Figure 30:
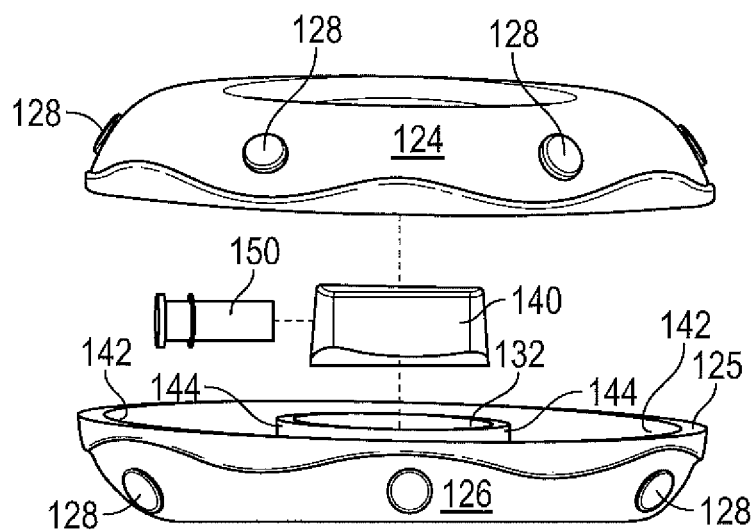
FIG. 30 is an exploded side elevation view of the ring shaped element of FIG. 26.
Figure 31:
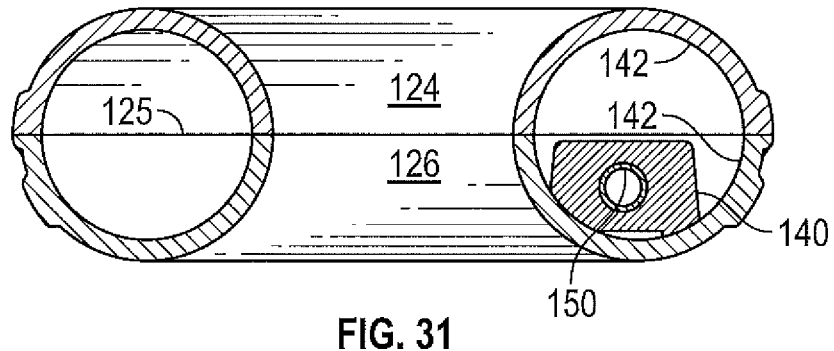
FIG. 31 is a cross-sectional view of the ring shaped element of FIG. 26.
Figure 32:
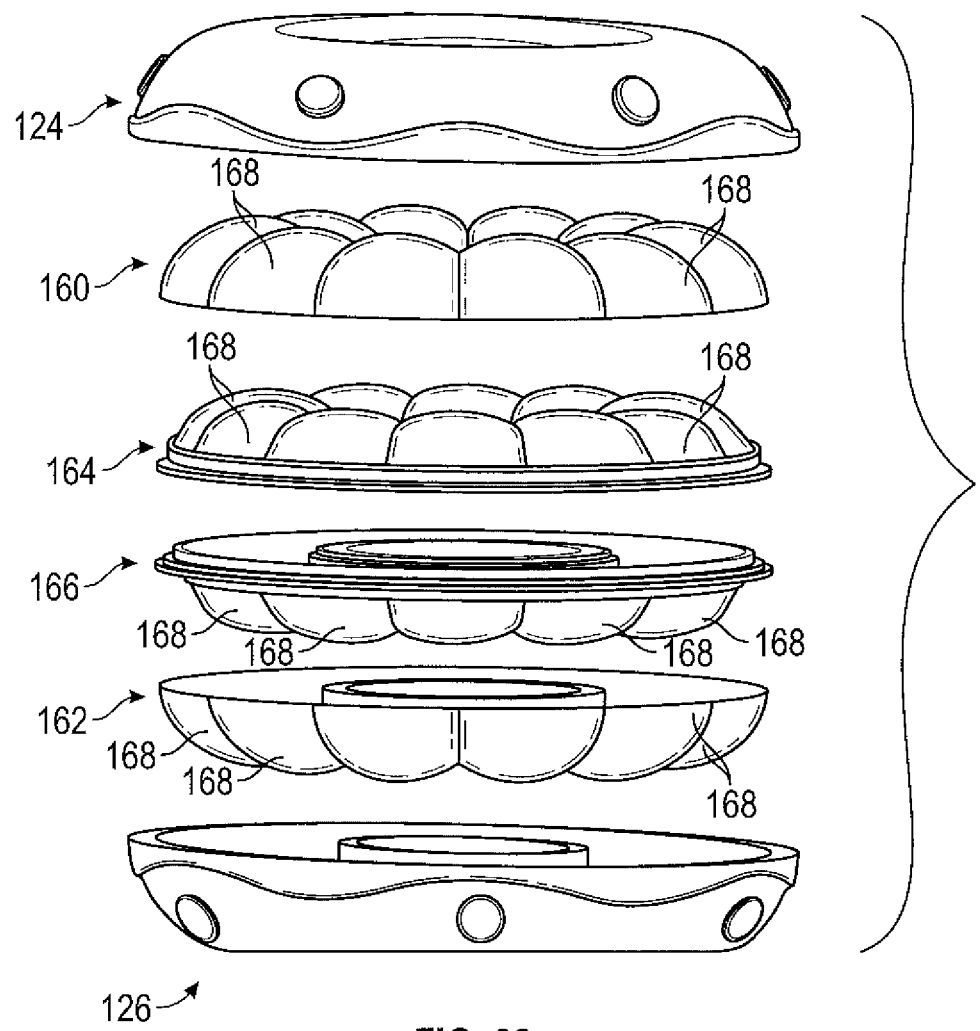
FIG. 32 is another exploded side elevation view of a ring shaped element in another embodiment comprising a plurality of layers.
Figure 33:
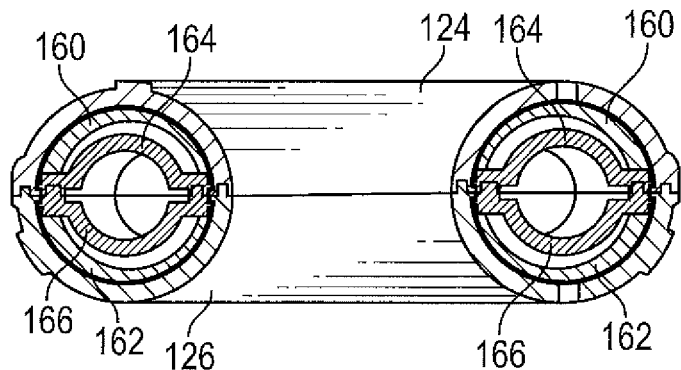
FIG. 33 is a cross-sectional view of the ring shaped element of FIG. 32.

There are two types of construction for the ring shaped members 120, a first type of construction as illustrated in FIGS. 30 and 31, and a second type of construction as illustrated in FIGS. 32 and 33. The ring members within this preferred embodiment can be either of the selected constructions, or both. For example, one ring member 120 could be the first type, while the second ring member 120 could be the second. Alternatively, both ring members 120 could be the first or second type constructions. Therefore, it should be understood that this embodiment is not limited to providing either of the types of constructions, but may be provided in a selected combination.

The illustrated ring members 120 are also shown in pairs, but it shall be understood that a single ring member can be used, or more than two ring members can be used.

Referring to FIGS. 30 and 31, a first type of construction is illustrated for a ring member 120. The ring member comprises the outer shell having to respective half sections 124 and 126 separated along a part line 125. A noise making member such as a squeaker 150 is placed within a protective squeaker housing 140. The housing 140 and squeaker 150 are disposed in the gap or space between the interior projection 144 defining the central opening 132 and the interior surface 142 of the selected half section 126. The housing is used to stabilize the squeaker within the ring member, and also to protect the squeaker from damage as an animal bites the ring member or otherwise causes it to compress or deform in shape.

As shown in FIG. 31, the height and width of the squeaker housing 140 is such that it does not extend above the part line 125; however, noting the extra space above the housing 140 would allow the squeaker housing to be larger if necessary. The housing communicates with a vent opening (not shown) formed on the half section 126 so that there may be expelled from the housing and drawn back into the housing as the ring member is compressed and decompressed.

The outer shell forming the half sections 124 and 126 is preferably elastomeric so that the outer shell collapses when compressed, but rebounds to its original shape when the force of compression is removed. The interior open space or chamber defined by the interior surface 142 allows for air therein to pass through the squeaker 150 when the outer shell is compressed, and exterior air is allowed to pass back through the squeaker when the toy is decompressed. This compression/decompression action allows for noise to be produced by the squeaker.

Referring to FIGS. 32 and 33, a second construction is illustrated for a ring member 120. In this embodiment, the outer shell comprising the first and second half sections 124 and 126 are supplemented with additional layers for purposes of providing a different elastomeric response when the pet toy is compressed by interaction with an animal, and these additional layers also can be used to generate different sounds as compared to the squeaker in the first construction.

The exploded view of FIG. 32 more specifically shows two interior layers, each comprising respective half sections. A first interior layer is formed by respective half sections 160 and 162, while a second interior layer is formed by respective half sections 164 and 166. The half sections 160, 162 and the half sections 164, 166 may each have a plurality of irregular shaped raised areas 168 as shown.

The cross-sectional view of FIG. 33 shows the half sections 160, 162 in substantial contact with the interior surface 142 of the outer shell. This is advantageous for ensuring that the half sections 160, 162 will follow the compression/deformation of the outer shell as it undergoes a shape change in response to the biting action or play of the animal. A small gap is shown between the half sections 160, 162 and the most interior layer formed by the half sections 164, 166. This small gap allows the half sections 160, 162 to effectively deform in shape or configuration, yet allows the interior layer to still function as a rebounding layer to force the half sections 160, 162 back to their original shape.

According to one specific configuration, the half sections 160, 162 may be made of a relatively thin material, such as a material to generate sound when compressed or otherwise displaced. The half sections 162, 164 may be made of relatively thicker material to act as a layer for structural rebound when the toy is compressed. More specifically, similar to the prior embodiments, one or more PET layers can be used for the half sections 160, 162 as a center layer to produce a crinkling, crackling, or crunching sound. One or more parts of elastomeric or natural rubber material may be used for the half sections 164, 166 as an inner shell to act as a rebounding force enabling the toy to quickly and effectively rebound to oppose external forces applied to the pet toy.

Although a squeaker 150 and squeaker housing 140 are not shown in the embodiment of the ring member 120 of FIGS. 32 and 33, it is further contemplated that this embodiment could also include the squeaker and housing to provide yet another noise making feature.

Figure 36:
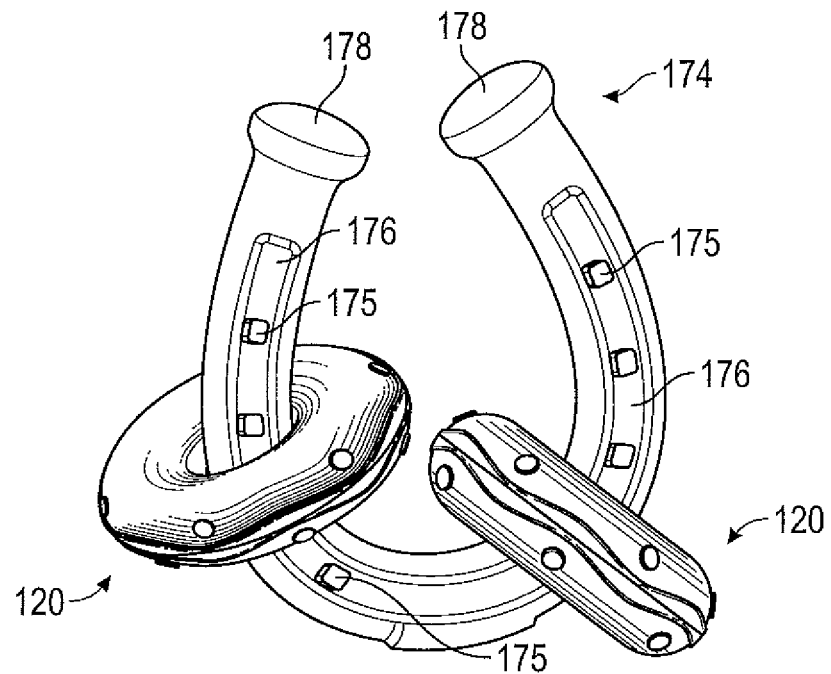
FIG. 36 is a first perspective view of another embodiment.
Figure 37:
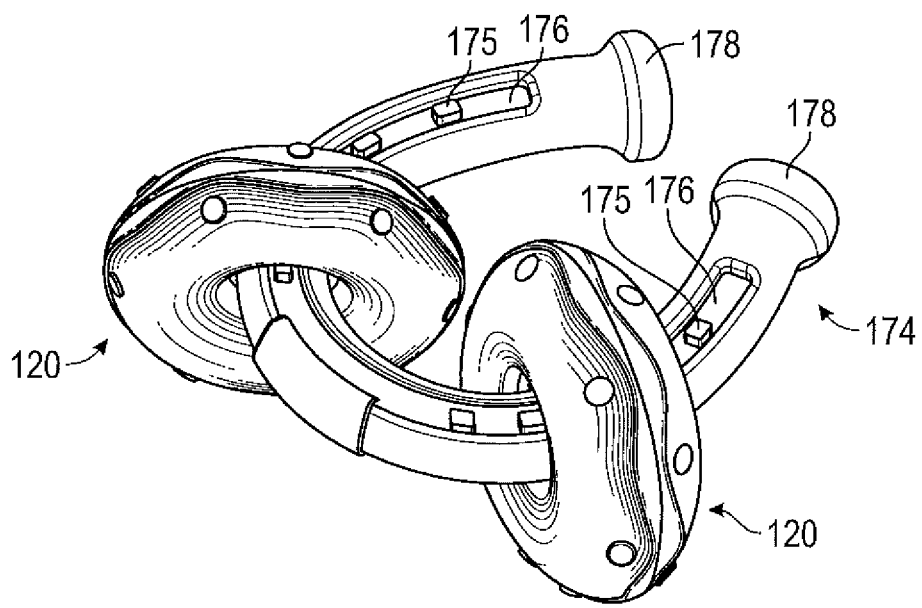
FIG. 37 is a second perspective view of the embodiment of FIG. 36.

FIGS. 36 and 37 show yet another embodiment of the invention in which one or more ring members 120 are provided in combination with a horseshoe shaped anchor member 174. As shown, the member 174 is generally characterized by a horseshoe shaped body 177 with enlarged caps or ends 178. A central groove 176 extends along a substantial length of the body 177. A plurality of projections 175 are spaced from one another within the central groove 176. The effective diameter of the caps 178 are larger than the diameters of the central openings 132 such that the ring members 120 remain secured between the caps 178. Preferably, the ring members 120 can be easily slipped or displaced along the body 177. As with the prior embodiments, the specific construction for the ring members 120 may be of the first or second type, or combinations thereof.

One or more PET layers create the center layer that produces the crinkling, crackling, or crunching sound. One or more parts of elastomeric or natural rubber material create the inner shell which acts as a rebounding force enabling the toy to quickly and effectively rebound to oppose external forces applied to the pet toy.

The preferred embodiments of the invention illustrate a number of different general shapes or configurations of combined modules, and in which multi-layers or concentric shells are used in selected ones of the modules. A squeaker may be held in and supported in a protected position within the interior chamber of the modules. The half molded sections for the inner and outer shells simplify construction.

Although the invention is described in particular detail with respect to preferred embodiments and accompanying drawings, it shall be understood that the invention is not specifically limited to the preferred embodiments and is rather encompassed by the scope of the claims appended hereto.

What is claimed is:

1. A pet toy comprising:
a thermoplastic molded anchor member;
at least one thermoplastic molded ring member secured to said anchor member, said ring member having a central opening in which said shaft is inserted;
said molded ring member having an inner shell layer disposed concentrically within an outer shell layer, at least one of said inner and outer shell layers being elastomeric causing said molded ring member to be compressible, said molded ring member further having a noise making element as a center layer disposed concentrically between said inner and outer shell layers, said center layer being made of a sound producing material activated when said center layer is displaced in response to deformation of said outer shell layer; and
wherein said inner shell layer and said center layer each have a plurality of irregular convex shaped raised areas, said raised areas of said inner shell layer and said center layer being stacked complementary wherein said center layer is in substantial contact with an interior surface of said outer shell layer and a small gap being created between each of said raised areas of said center layer and each of said raised areas of said inner shell layer.

2. A pet toy, as claimed in claim 1, wherein:
said outer shell layer is molded in respective half sections and joined to assemble said pet toy.

3. A pet toy, as claimed in claim 1, wherein:
said inner shell layer is molded in respective half sections and joined to one another.

4. A pet toy, as claimed in claim 1, wherein:
said center layer is molded in respective half sections and joined to one another.

5. A pet toy, as claimed in one of claim 1, wherein:
said half sections of said outer shell, said inner shell, or said center layer are each substantially symmetrical about an axis.

6. A pet toy, as claimed in claim 1, wherein material of the outer shell layer has a different rigidity or flexibility as compared to material of the inner shell layer.

7. A pet toy, as claimed in claim 1, wherein the inner and outer shell layers have different thicknesses.

8. A pet toy, as claimed in claim 1, wherein the inner and outer shell layers each include a vent opening to allow air to pass into and out from said interior chamber.

9. A pet toy, as claimed in claim 1, wherein:
said noise making device includes a squeaker and a housing that receives said squeaker and said housing being disposed within said outer shell layer.

10. A pet toy, as claimed in claim 1, wherein:
said anchor member is bone shaped having a bone shaft and an opposing ball located at each end of said bone shaft, wherein a diameter of said central opening is smaller than an effective diameter of the balls so the at least one ring member remains secured between the balls, yet said ring member may loosely slide along said bone shaft.

11. A pet toy, as claimed in claim 1, wherein:
said anchor member is horseshoe shaped.

* * * * *